United States Patent
Otsuka

(10) Patent No.: US 10,976,976 B2
(45) Date of Patent: Apr. 13, 2021

(54) INFORMATION PROCESSING APPARATUS, INFORMATION PROCESSING SYSTEM, AND RECORDING MEDIUM

(71) Applicant: Minari Otsuka, Kanagawa (JP)

(72) Inventor: Minari Otsuka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/690,260

(22) Filed: Nov. 21, 2019

(65) Prior Publication Data

US 2020/0192617 A1 Jun. 18, 2020

(30) Foreign Application Priority Data

Dec. 17, 2018 (JP) .............................. JP2018-235438
Jul. 23, 2019 (JP) .............................. JP2019-135623

(51) Int. Cl.
*G06F 3/12* (2006.01)

(52) U.S. Cl.
CPC .......... *G06F 3/1258* (2013.01); *G06F 3/1205* (2013.01); *G06F 3/1238* (2013.01); *G06F 3/1285* (2013.01)

(58) Field of Classification Search
CPC .... G06F 3/1258; G06F 3/1259; G06F 3/1205; G06F 3/1238; G06F 3/1285; G06F 3/1287; G06F 3/1288
See application file for complete search history.

(56) References Cited

U.S. PATENT DOCUMENTS

| | | | |
|---|---|---|---|
| 2010/0195144 A1* | 8/2010 | Kawai ................... | G06F 21/608 358/1.15 |
| 2015/0029552 A1* | 1/2015 | Nishizawa ............ | G06F 3/1288 358/1.15 |
| 2015/0055159 A1* | 2/2015 | Kazama ............... | H04N 1/2369 358/1.13 |

FOREIGN PATENT DOCUMENTS

JP 2013-239204 11/2013

* cited by examiner

*Primary Examiner* — Moustapha Diaby
(74) *Attorney, Agent, or Firm* — IPUSA, PLLC

(57) ABSTRACT

An information processing apparatus is coupled to a terminal device and an image forming apparatus via a network. The information processing apparatus includes a processor, in communication with a memory, executing a process including receiving a print job from the terminal device; accumulating a print rule defining a change of a print setting; detecting whether the print setting defined in the print rule is included as a print setting included in the print job; changing the print setting in the print job according to the print rule, based on a result of the detecting; and outputting, to the image forming apparatus, the print job in which the print setting has been changed.

7 Claims, 27 Drawing Sheets

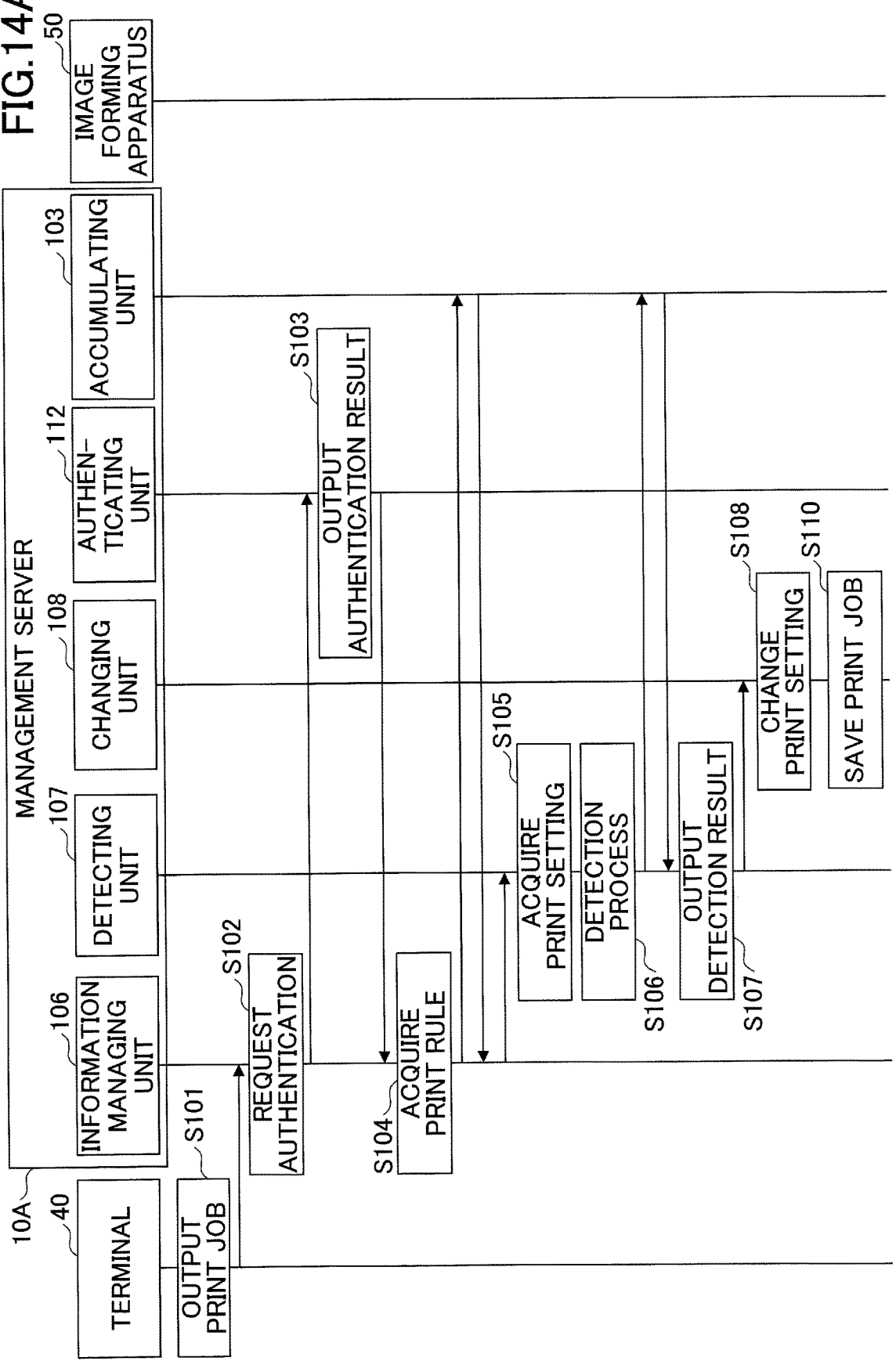

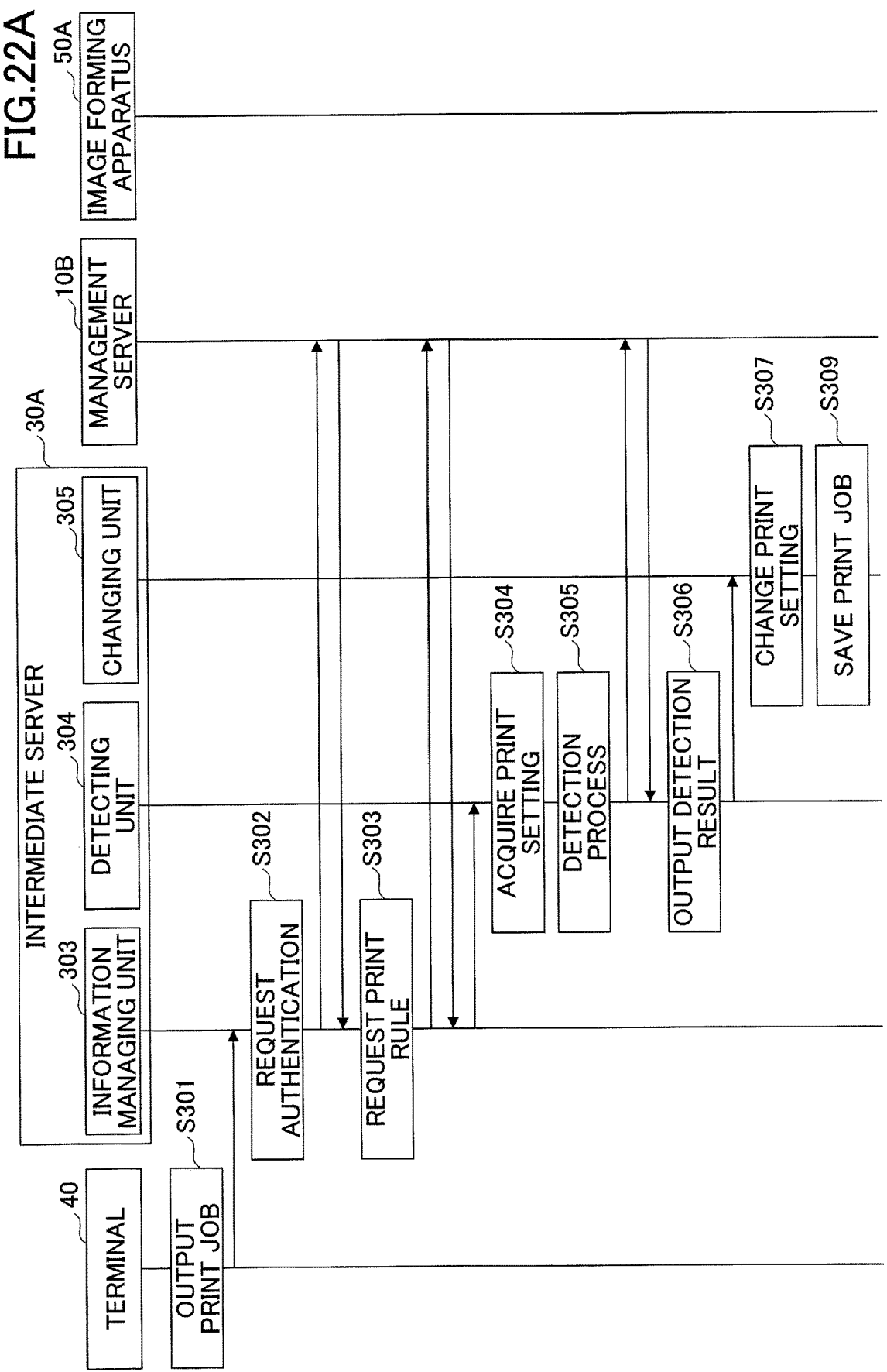

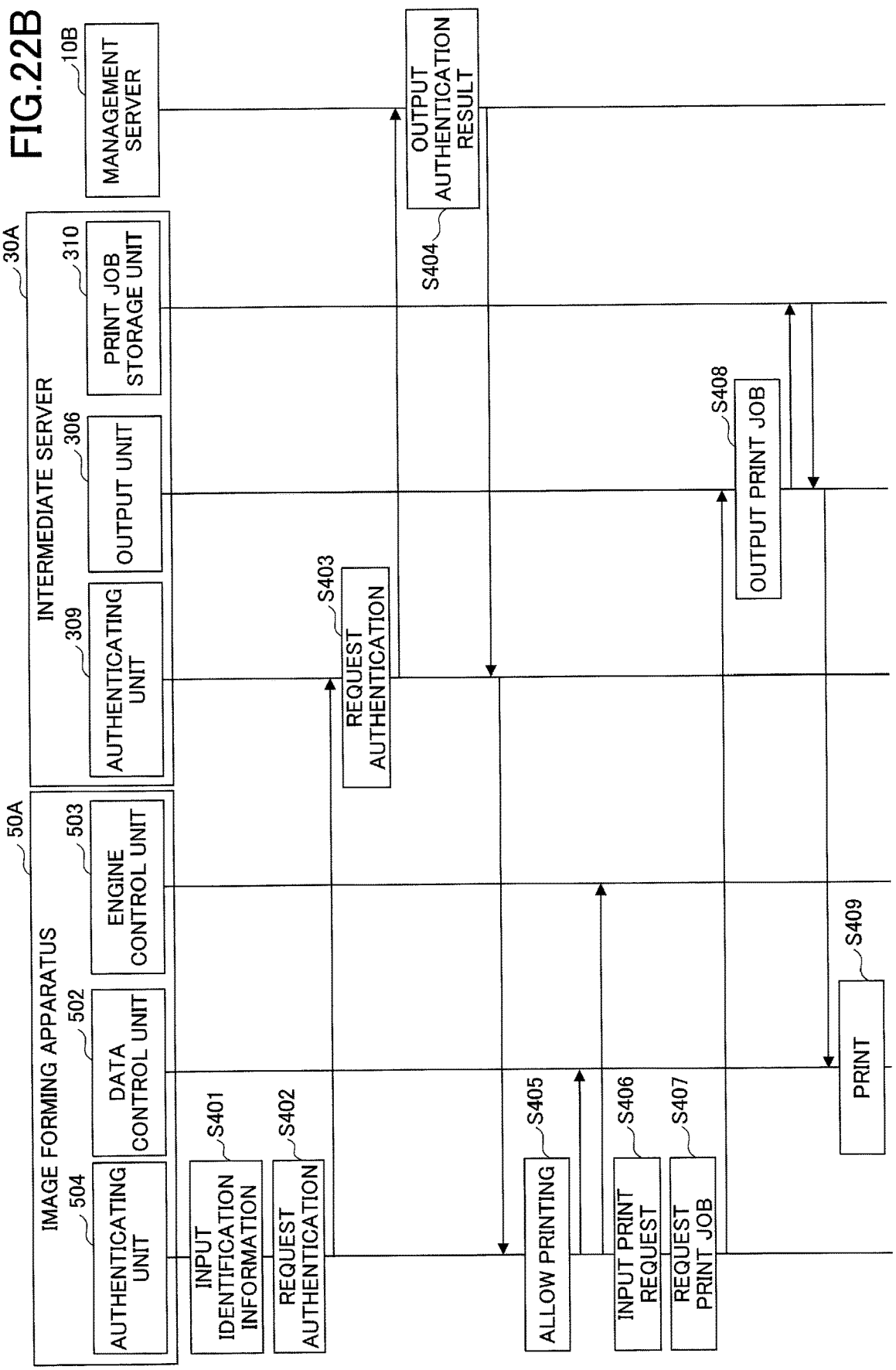

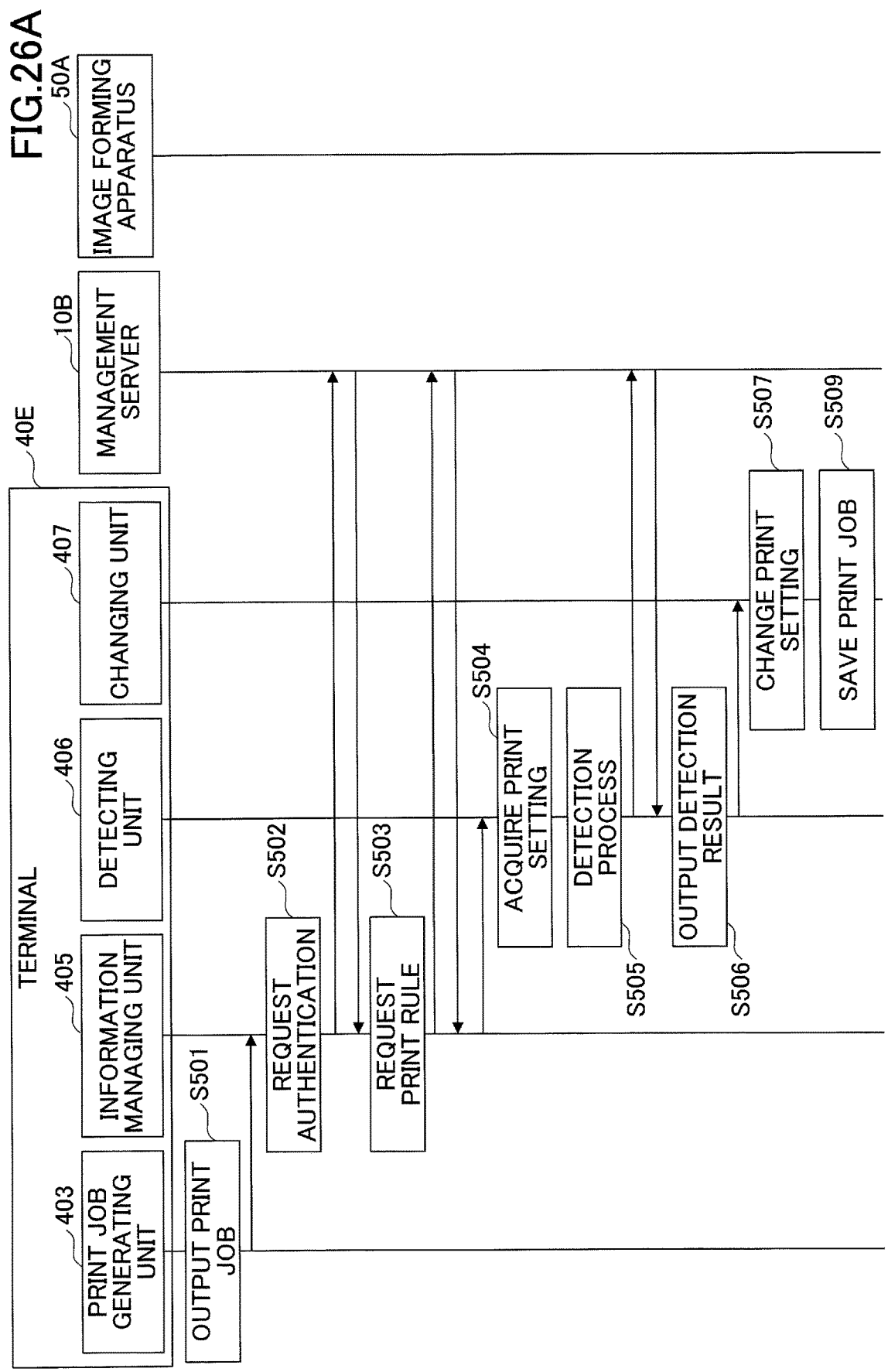

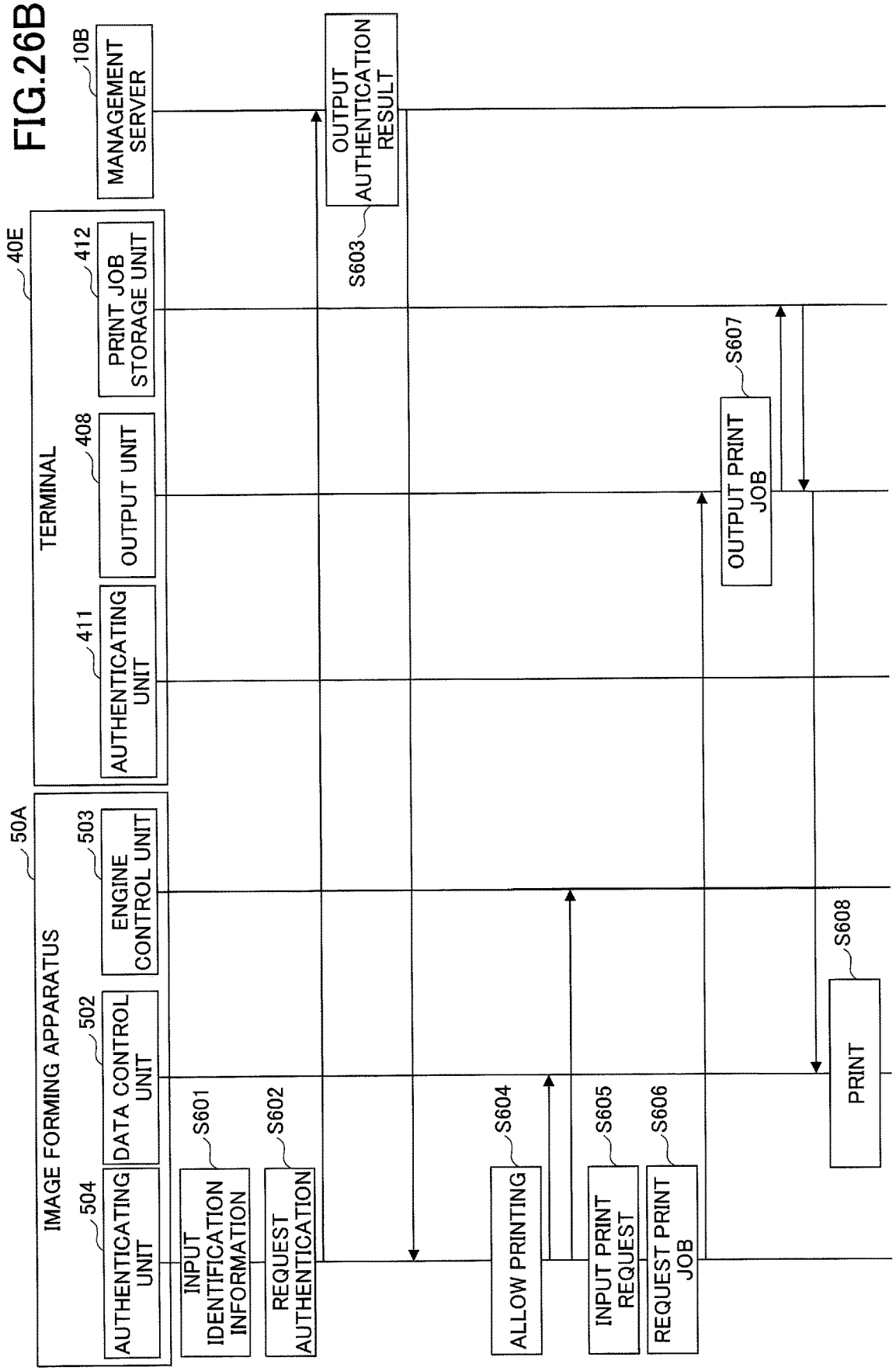

US 10,976,976 B2

INFORMATION PROCESSING APPARATUS, INFORMATION PROCESSING SYSTEM, AND RECORDING MEDIUM

CROSS-REFERENCE TO RELATED APPLICATION

The present application is based on and claims priority under 35 U.S.C. § 119 to Japanese Patent Application No. 2018-235438, filed on Dec. 17, 2018 and Japanese Patent Application No. 2019-135623, filed on Jul. 23, 2019, the contents of which are incorporated herein by reference in their entirety.

BACKGROUND OF THE INVENTION

1. Field of the Invention

The present invention relates to an information processing apparatus, an information processing system, and a recording medium.

2. Description of the Related Art

A system in which a terminal (terminal device) and an information processing apparatus such as a multifunction peripheral (MFP/Printer/Product) are connected via a network, is known.

In such a system, there are cases where the terminal is connected to the image forming apparatus via a server (see, for example, Patent Document 1). Patent Document 1 discloses a data processing apparatus (server) that causes an image forming apparatus that is an output destination to print a print job output from the terminal, according to a particular condition. The data processing apparatus determines the output destination according to a rule defining a condition with respect to the selection of the output destination and a change in the output content.

Patent Document 1: Japanese Unexamined Patent Application Publication No. 2013-239204

SUMMARY OF THE INVENTION

According to one aspect of the present invention, there is provided an information processing apparatus coupled to a terminal device and an image forming apparatus via a network, the information processing apparatus including a processor, in communication with a memory, executing a process including receiving a print job from the terminal device; accumulating a print rule defining a change of a print setting; detecting whether the print setting defined in the print rule is included as a print setting included in the print job; changing the print setting in the print job according to the print rule, based on a result of the detecting; and outputting, to the image forming apparatus, the print job in which the print setting has been changed.

BRIEF DESCRIPTION OF THE DRAWINGS

FIG. 14A is a sequence diagram illustrating an example of an operation of an information processing system according to the modified example of the first embodiment of the present invention;

FIG. 22A illustrates an example of an operation of an information processing system according to the second modified example of the second embodiment;

FIG. 22B illustrates an example of an operation of the information processing system according to the second modified example of the second embodiment;

FIG. 26A is a sequence diagram illustrating an example of an operation of an information processing system according to the modified example of the third embodiment; and FIG. 26B is a sequence diagram illustrating an example of an operation of the information processing system according to the modified example of the third embodiment.

DETAILED DESCRIPTION OF THE PREFERRED EMBODIMENTS

Figure 1:
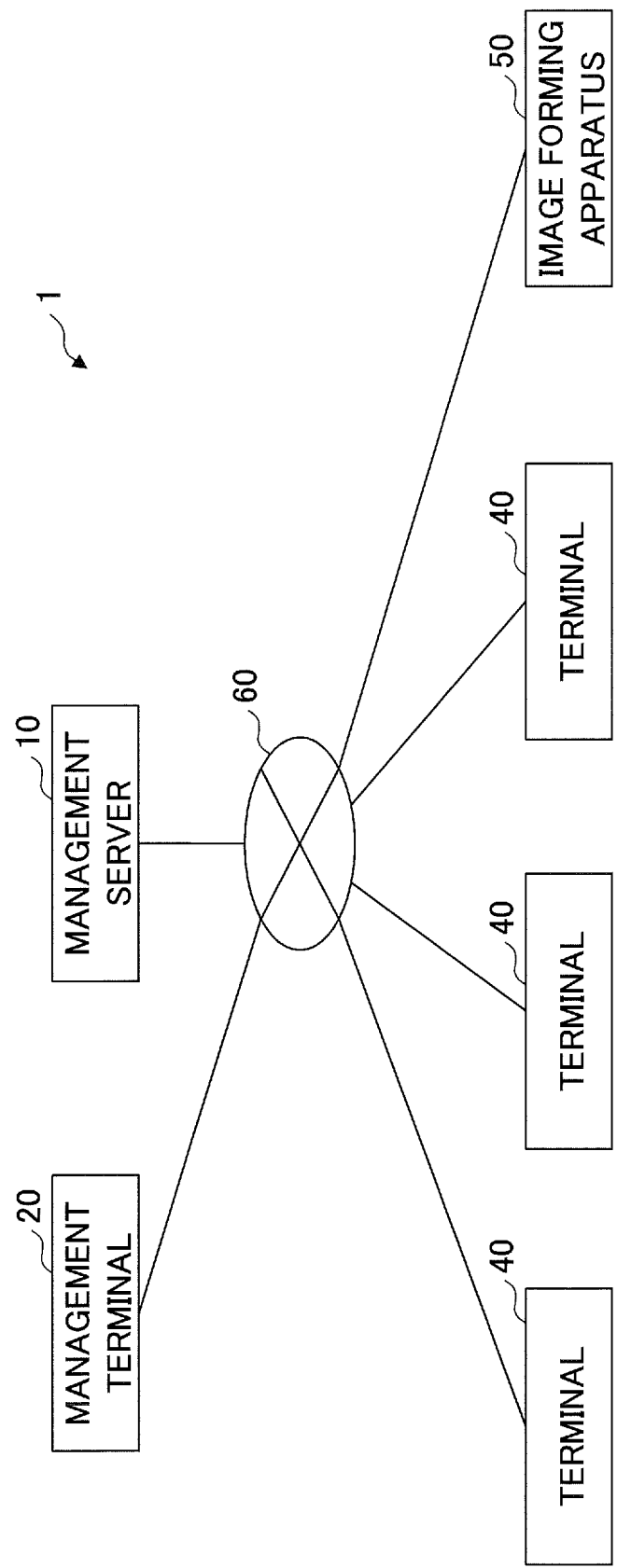
FIG. 1 is a diagram illustrating an example of a configuration of an information processing system according to a first embodiment of the present invention.

The rule in Patent Document 1 described above is also referred to as a print rule, and is set in advance. For example, a print setting included in the print job output from the terminal is changed according to the print rule, and then printing is performed. Therefore, there are cases where the print result desired by the user of the terminal is not obtained. Specifically, when the user of the terminal desires to set a print setting as a print rule, there may be cases where the corresponding print setting does not exist as a value that can be set as a print rule, and the desired print result cannot be obtained. Further, in order to change a print rule according to the user's desire, there is a need to change a processing program, and the like.

A problem to be addressed by an embodiment of the present invention is to simplify the operation of changing a print rule.

Embodiments of the present invention will be described by referring to the accompanying drawings. In the specification and drawings of the embodiments, the elements having substantially the same functions are denoted by the same reference numerals, and overlapping descriptions are omitted.

First Embodiment

Configuration of Information Processing System 1 According to First Embodiment A configuration of an information processing system 1 according to a first embodiment will be described. FIG. 1 is a diagram illustrating an example of the configuration of the information processing system 1 according to the first embodiment. As illustrated in FIG. 1, the information processing system 1 includes a management server 10, a management terminal 20, a terminal 40 (terminal device), and an image forming apparatus 50. According to the present embodiment, the information processing system 1 processes, for example, a print job generated by the terminal 40.

The management server 10 and the management terminal 20 communicate with each other. According to the present embodiment, the management server 10 and the management terminal 20 communicate with each other via a communication network 60 (also referred to as first communication network 60). Further, the management server 10, the terminal 40, and the image forming apparatus 50 communicate with each other via the communication network 60.

In the information processing system 1, with respect to one management server 10, one or more terminals 40 and one or more image forming apparatuses 50 may be disposed. For example, the management server 10 may be disposed at a head office, a home store, and the like, and the terminal 40 and the image forming apparatus 50 may be disposed at a branch office, a sales office, and the like. The information processing system 1 may include one or more management servers 10, one or more management terminals 20, one or more terminals 40, and one or more image forming apparatuses 50.

For example, the communication network 60 may be the Internet, an intranet, a wired Local Area Network (LAN), a wireless LAN, a mobile communication network, a telephone line communication network, or other networks using wired or wireless communication. Although not limited thereto, in the present embodiment, the communication network 60 is assumed to be an intranet.

Further, the management server 10, the management terminal 20, the terminal 40, and the image forming apparatus 50 are separate apparatuses; however, two or more of these apparatuses may be configured as an integrated apparatus. For example, the management server 10 and the management terminal 20 may be integrated. Further, each apparatus may also be configured by one or more apparatuses. When an apparatus is configured by two or more apparatuses, the two or more apparatuses may be disposed in one device, or may be disposed to two or more separate devices.

The management server 10 is an information processing apparatus having a communication function. The management server 10 holds information and the like for managing the information processing system 1. For example, the management server 10 holds print rules that are rules for forming an image on a recording medium by the image forming apparatus 50. The print rules may be common rules within the information processing system 1, or may be rules set for each terminal 40, or may be rules set for each user of the terminal 40. Further, the management server 10 functions as a print server that manages data and the like of an image to be formed on a recording medium based on a request from the terminal 40 or the image forming apparatus 50 and that transmits the image data to the image forming apparatus 50. The management server 10 is an example of an information processing apparatus.

As described above, in the present embodiment, the image forming apparatus 50 is described as an apparatus for forming an image representing the content of data on a recording medium, i.e., an apparatus for performing printing. Examples of recording media include, but are not limited to, sheet materials such as paper, cloths, films, or boards. In the present embodiment, the recording medium is assumed to be paper. Accordingly, the image forming apparatus 50 forms an image by printing on paper.

Figure 2:
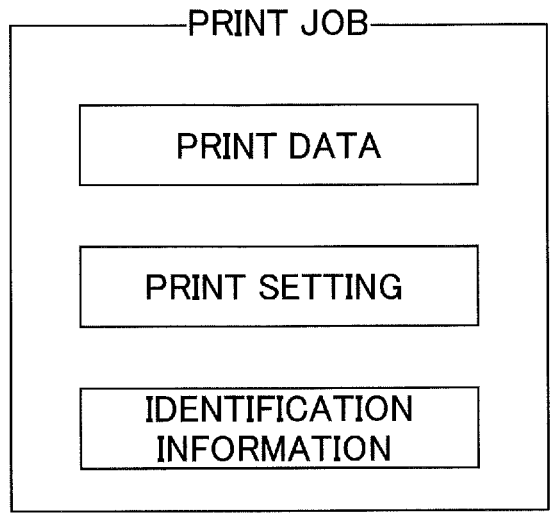
FIG. 2 is a diagram illustrating an example of data of a print job according to the first embodiment of the present invention.

FIG. 2 is a diagram illustrating an example of data of a print job. As illustrated in FIG. 2, the print job is data including print data, print settings, identification information, and the like. Print data is data (image data) representing an image to be formed on a recording medium. The print settings are setting information that can be set when printing is performed based on print data. The print settings include, for example, a color mode specification, a specification of single sided printing or double sided printing, specifications of stapling, hole-punching, stamping, and the like, a specification of the paper size or medium type, specifications of the paper feed direction, the paper feed port, and the paper ejection port, a specification of the print quality, and the like.

The print settings are set by using a language such as Print Job Language (PJL) and Page Description Language (PDL).

In such a language, the print setting can be expressed as, for example, "SET KEY=VALUE". "KEY" represents the setting item, and "VALUE" represents the setting content. For example, "SET KEY_A=ON" represents that the printing process "KEY_A" is set to ON (to be executed), and "SET KEY_A=OFF" represents that the printing process "KEY_A" is set to OFF (not to be executed). Further, for example, "SET DATAMODE=GRAYSCALE" represents that the color mode is set to "monochrome".

The identification information may be obtained by acquiring the identification information of the terminal 40 and/or the identification information of a user using the terminal 40. These pieces of identification information may be included in the print job. Hereinafter, the information including at least one of the identification information of the terminal 40 and the identification information of the user using the terminal 40, is also referred to as "terminal identification information" with respect to the terminal 40.

The print job also includes information such as a document name, a job issuance time, a personal name, the presence or absence of a particular term, and the like. Further, the print job may also include user-specific information such as the user name, the terminal name, and a role, a group, and an authority given to the user; or terminal-specific information such as the Media Access Control (MAC) address, the Internet Protocol (IP) address, and the IP address range of the terminal.

Figure 3:
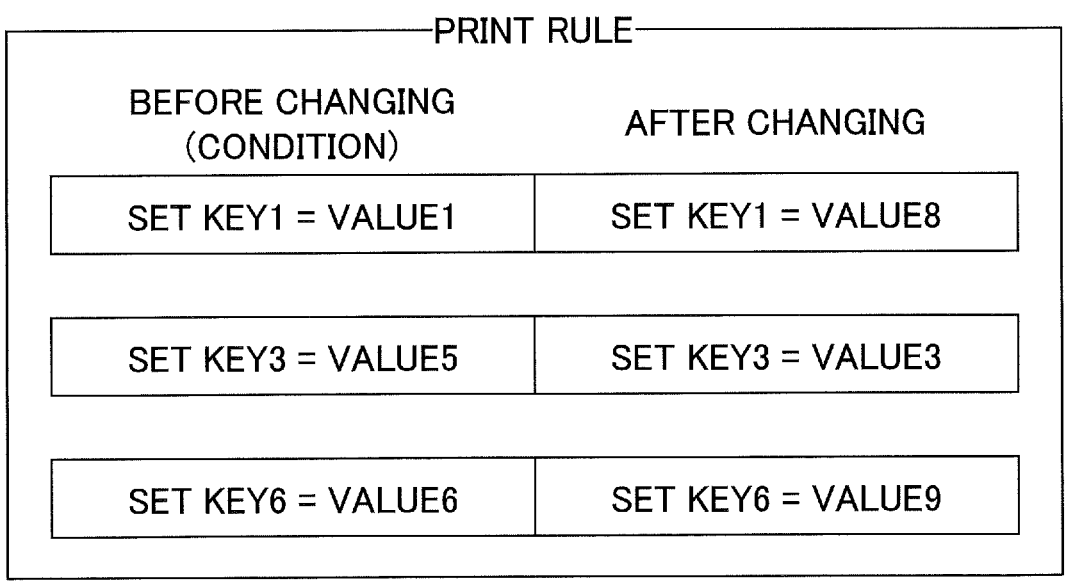
FIG. 3 is a diagram illustrating an example of a print rule according to the first embodiment of the present invention.

FIG. 3 is a diagram illustrating an example of a print rule. The print rule is a rule relating to the changing of a print setting. Specifically, the print rule is a rule defining a condition corresponding to a print setting that is a set of a "KEY" and a "VALUE", and defining to change the print setting when this condition is satisfied. In the example illustrated in FIG. 3, for example, it is defined that "SET KEY1=VALUE1" is to be changed to "SET KEY1=VALUE8". A plurality of settings may be made by a print rule.

More specifically, for example, the print rule defines to change a print setting "SET DATAMODE=COLOR" for setting the color mode to "color", to a print setting "SET DATAMODE=GRAYSCALE" for setting the color mode to "monochrome".

When the print rule is a rule set for each terminal 40 or for each user using the terminal 40, the print rule is associated with the identification information of the terminal 40 or the user.

Referring back to FIG. 1, the management terminal 20 is an information processing apparatus having a communication function. The management terminal 20 manages the information stored in the management server 10. For example, the management terminal 20 stores a print rule in the management server 10 and changes the stored print rule. Examples of the management terminal 20 are a notebook personal computer (PC), a smart device such as a smartphone and a tablet terminal, a wearable PC, a desktop PC, and the like. In the present embodiment, the management terminal 20 is described as a desktop PC.

The terminal 40 is an information processing apparatus having a communication function. The terminal 40 transmits a print job to the image forming apparatus 50. The terminal 40 itself may generate a print job or the terminal 40 may acquire a print job from an external device. In the present embodiment, the terminal 40 transmits the print job to the image forming apparatus 50 via the communication network 60 and the management server 10. Examples of the terminal 40 are a notebook PC, a mobile phone, a smart device such as a smartphone and a tablet terminal, a game machine, a Personal Digital Assistant (PDA), a digital camera, a wearable PC, a desktop PC, a video conferencing terminal, an interactive white board (IWB: a white board having a function of an electronic blackboard capable of mutual communication), and the like. In the present embodiment, the terminal 40 is described as a notebook PC.

The image forming apparatus 50 is an information processing apparatus having an image processing function and a communication function. Examples of the image forming apparatus 50 are a multifunction peripheral (MFP), a facsimile machine, a scanner, a printer, and the like. In the present embodiment, the image forming apparatus 50 is described as an MFP having a facsimile function, a scanner function, and a printer function.

In the information processing system 1, the terminal 40 generates a print job including print data that is data of an image to be formed on a recording medium, and outputs the print job to the image forming apparatus 50 via the communication network 60 and the management server 10. At this time, the management server 10 acquires a print rule, and when a condition is satisfied, the management server 10 changes the print setting based on the print rule.

Figure 4:
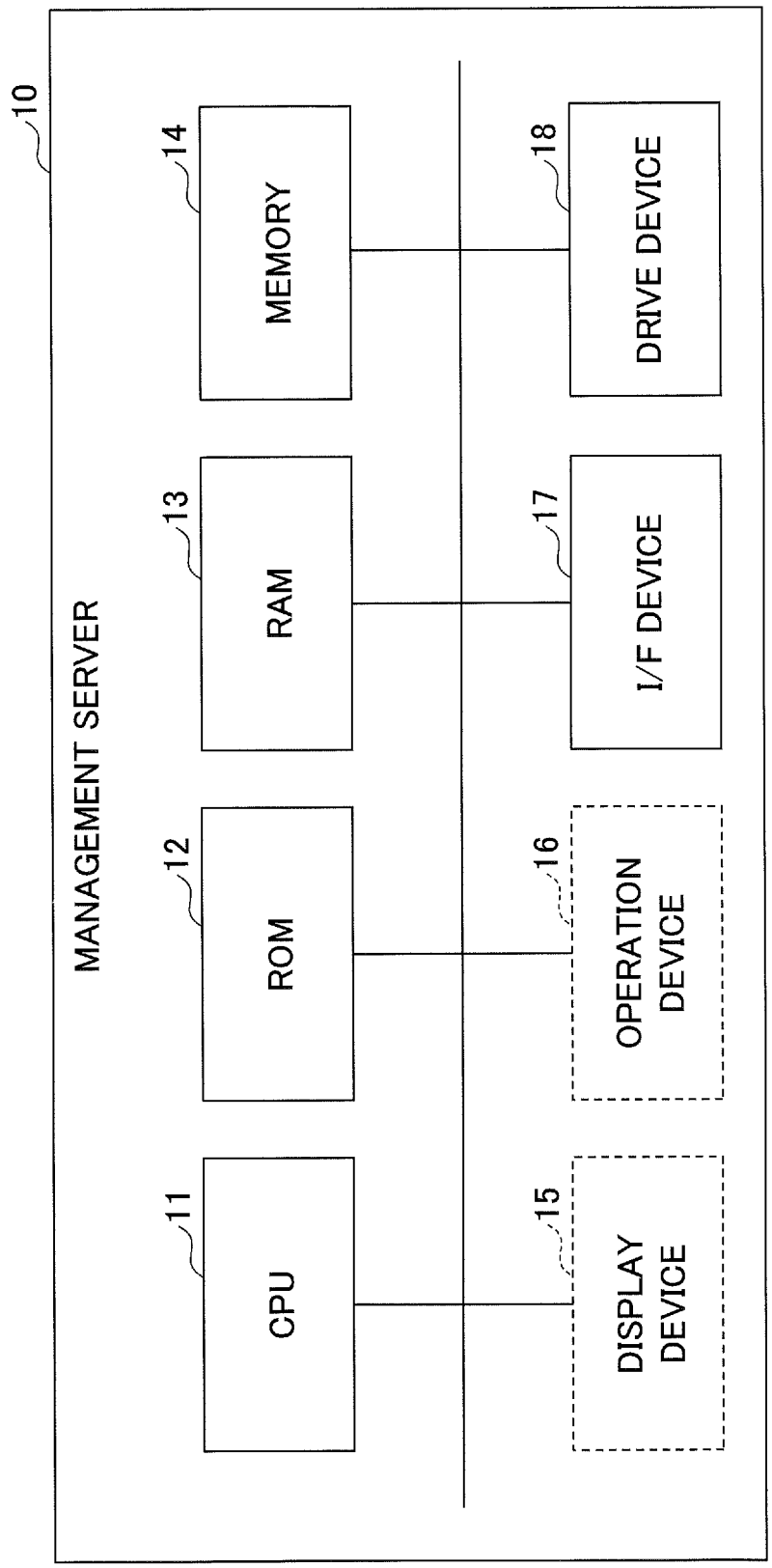
FIG. 4 is a block diagram illustrating an example of a hardware configuration of a management server according to the first embodiment of the present invention.

Hardware Configuration of Management Server 10 According to First Embodiment The hardware configuration of the management server 10 will be described. FIG. 4 is a block diagram illustrating an example of the hardware configuration of the management server 10 according to the first embodiment. As illustrated in FIG. 4, the management server 10 includes, as elements, a Central Processing Unit (CPU) 11, a Read-Only Memory (ROM) 12, a Random Access Memory (RAM) 13, a memory 14, a display device 15, an operation device 16, an interface (I/F) device 17, and a drive device 18. These elements are connected to one another, for example, via a bus, and may be connected via either wired communication or wireless communication. Also, not all of the above elements are essential. For example, at least one of the display device 15 and the operation device 16 may be a separate device from the management server 10, and may be connected in a wired or wireless manner to the management server 10.

The CPU 11 is configured by a processor and the like and controls the operations of the respective units of the management server 10 and the overall operation of the management server 10. The ROM 12 is configured by a non-volatile semiconductor storage device and stores various programs and various parameters that are operated by the management server 10. For example, the ROM 12 functions as a storage device for storing a boot program such as the Basic Input/Output System (BIOS), the Extensible Firmware Interface (EFI), and the like. The RAM 13 is configured by a volatile semiconductor storage device such as a Dynamic Random Access Memory (DRAM), a Static Random Access Memory (SRAM), and the like. The RAM 13 is used as a work area of the CPU 11. The RAM 13 provides a storage area for temporarily saving data when performing various kinds of signal processing and image processing operations.

The memory 14 enables storage of various kinds of information and retrieval of the stored information. For example, the memory 14 stores various kinds of information such as data used by various programs and print rules. The memory 14 is configured by a storage device such as a volatile or non-volatile semiconductor memory, a hard disk drive (HDD), a Solid State Drive (SSD), and the like. Note that the memory 14 may include the ROM 12 and/or the RAM 13.

A program is held in advance in the ROM 12 or the memory 14. A program is read from the ROM 12 or the memory 14 and expanded in the RAM 13 by the CPU 11. The CPU 11 executes each encoded instruction in the program expanded in the RAM 13.

Note that a program is not limited to being stored in the ROM 12 and the memory 14; for example, a program may be stored in a storage medium such as a recording disk and the like. For example, a distributed storage medium may be set in the drive device 18, and various programs recorded in the storage medium may be read out by the drive device 18. Further, the program may be transmitted to the I/F device 17 via a wired network, a wireless network, broadcasting and the like, and may be incorporated into the RAM 13 and the like.

Note that the functions implemented by the CPU 11 described above may be implemented by a program executing unit such as the CPU 11, may be implemented by a circuit, or may be implemented by a combination of a program executing unit and a circuit. For example, the functions may be implemented by Large Scale Integration (LSI) that is an integrated circuit. Each of the functions may be individually formed as one chip, or some or all of the functions may be formed as one chip. As the LSI, a Field Programmable Gate Array (FPGA) that can be programmed after manufacturing the LSI, a reconfigurable processor that can reconfigure the connections and/or settings of circuit cells within the LSI, an application specific integrated circuit (ASIC) in which circuits of a plurality of functions are combined into a single circuit for a particular purpose, and the like, may be used.

The display device 15 displays various screens according to the control of the CPU 11. The display device 15 may be a display such as a liquid crystal panel, an organic electroluminescence (EL) display, an inorganic EL display, and the like. The display device 15 may include a speaker for audio output. The display device 15 may be a touch panel also serving as the operation device 16.

The operation device 16 is a device that accepts operations input by a user. The operation device 16 may include input devices such as buttons, dials, keys, a mouse, a touch panel, a microphone for voice input, and the like.

The I/F device 17 is a connection device for connecting to the communication network 60 and other apparatuses. The I/F device 17 is connected to the management terminal 20, the terminal 40, and the image forming apparatus 50 via the communication network 60. Further, the I/F device 17 is connected to another apparatus via wired communication or wireless communication. In the present embodiment, the management server 10 and the management terminal 20 are connected via the communication network 60, and may be connected via wired communication or wireless communication.

The drive device 18 is a device in which a storage medium is set. The storage medium may be a medium for optically, electrically, or magnetically recording information, such as a compact disk read-only memory (CD-ROM), a flexible disk, a magneto-optical disk and the like, or may be a medium such as a semiconductor memory for electrically recording information such as a ROM, a flash memory, and the like.

Hardware Configuration of Terminal 40 According to First Embodiment

Figure 5:
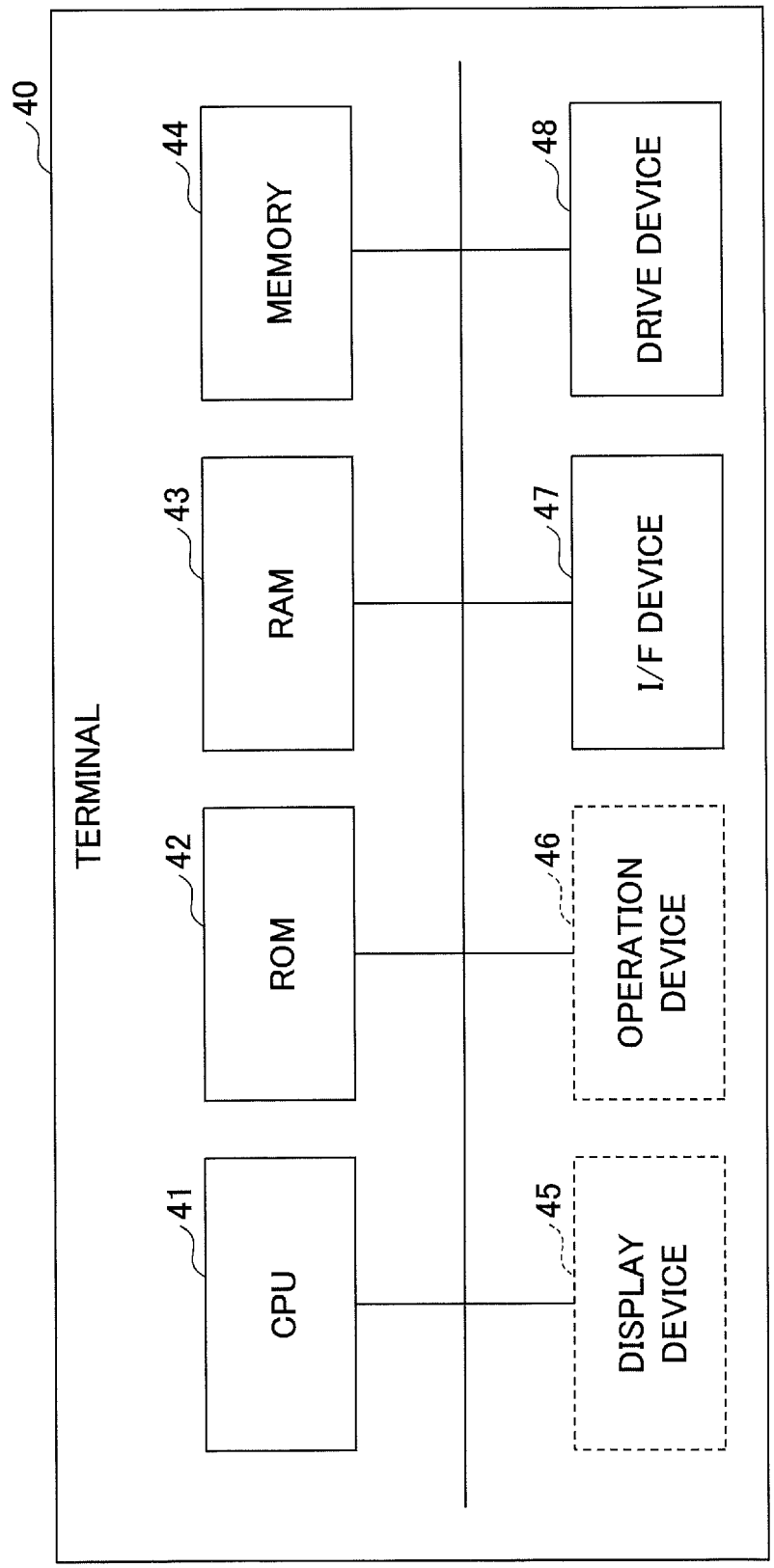
FIG. 5 is a block diagram illustrating an example of a hardware configuration of a terminal according to the first embodiment of the present invention.

The hardware configuration of the terminal 40 will be described. FIG. 5 is a block diagram illustrating an example of the hardware configuration of the terminal 40 according to the first embodiment. As illustrated in FIG. 5, the terminal 40 includes, as elements, a CPU 41, a ROM 42, a RAM 43, a memory 44, a display device 45, an operation device 46, an I/F device 47, and a drive device 48. These elements are connected to one another, for example, via a bus, and may be connected via either wired communication or wireless communication. Also, not all of the above elements are essential. For example, at least one of the display device 45 and the operation device 46 may be a separate device from the terminal 40, and may be connected in a wired or wireless manner to the terminal 40.

The configurations and functions of the CPU 41, the ROM 42, the RAM 43, the memory 44, the display device 45, the operation device 46, the I/F device 47, and the drive device 48 are the same as those of the CPU 11, the ROM 12, the RAM 13, the memory 14, the display device 15, the operation device 16, the I/F device 17, and the drive device 18, respectively, and, therefore, the descriptions thereof will be omitted.

Note that the I/F device 47 is a connection device for connecting to the communication network 60 and other apparatuses. The I/F device 47 is connected to the management server 10, the image forming apparatus 50, and other apparatuses via the communication network 60. The I/F device 47 is connected to other apparatuses via wired communication or wireless communication.

The hardware configuration of the management terminal 20 is the same as that of the terminal 40, and, therefore, descriptions thereof are omitted.

Figure 6:
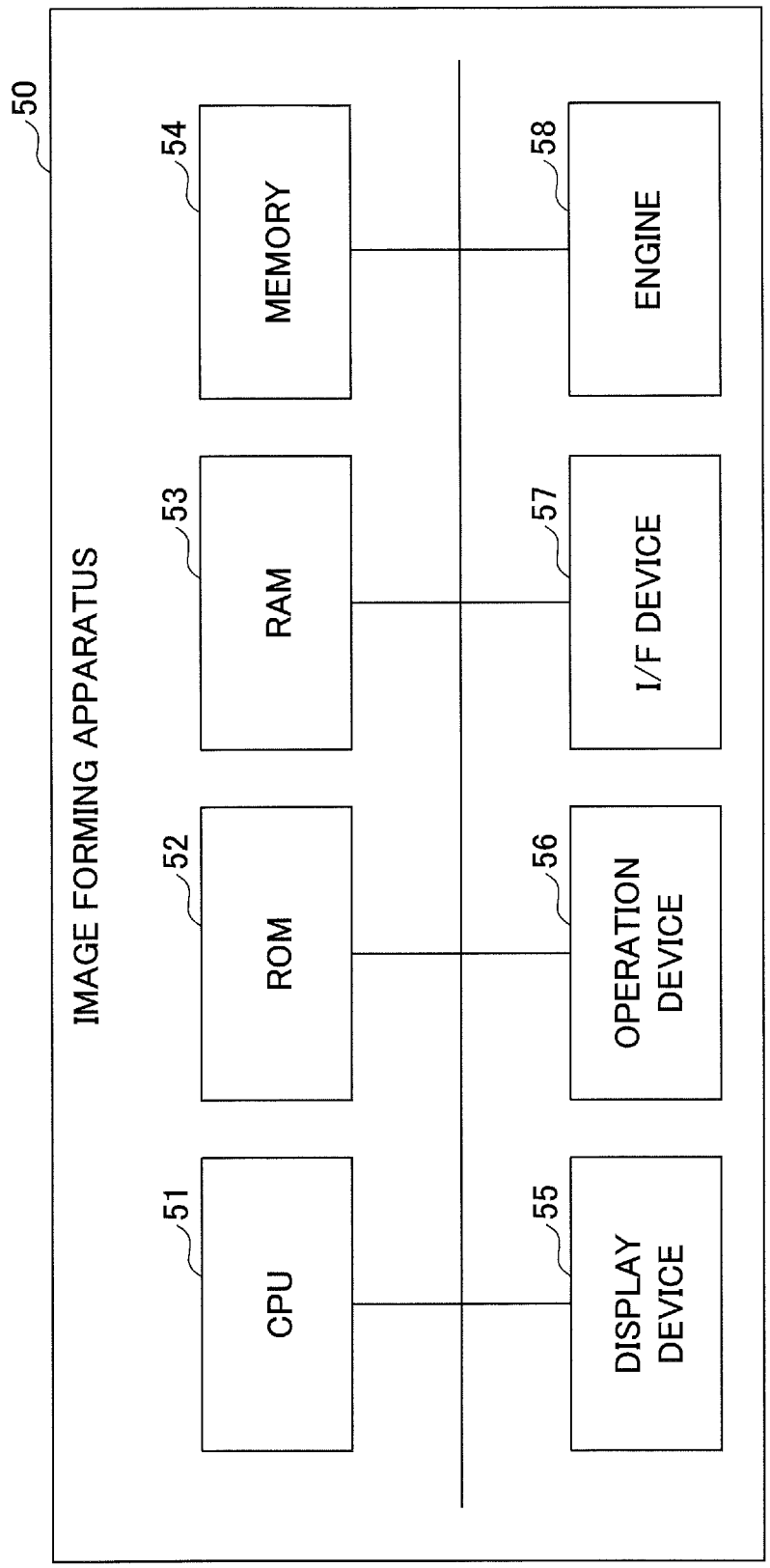
FIG. 6 is a block diagram illustrating an example of a hardware configuration of an image forming apparatus according to the first embodiment of the present invention.

Hardware Configuration of Image Forming Apparatus 50 According to First Embodiment The hardware configuration of the image forming apparatus 50 will be described. FIG. 6 is a block diagram illustrating an example of the hardware configuration of the image forming apparatus 50 according to the first embodiment. As illustrated in FIG. 6, the image forming apparatus 50 includes, as elements, a CPU 51, a ROM 52, a RAM 53, a memory 54, a display device 55, an operation device 56, an I/F device 57, and an engine 58. These elements are connected to one another, for example, via a bus, and may be connected via either wired communication or wireless communication.

The configurations and functions of the CPU 51, the ROM 52, the RAM 53, the memory 54, the display device 55, the operation device 56, and the I/F device 57 are the same as those of the CPU 11, the ROM 12, the RAM 13, the memory 14, the display device 15, the operation device 16, and the I/F device 17, respectively, and, therefore, the descriptions thereof will be omitted.

Note that the I/F device 57 is a connection device for connecting to the communication network 60 and other apparatuses. The I/F device 57 is connected to the management server 10, the terminal 40, and other apparatuses via the communication network 60. Further, the I/F device 57 is connected to other apparatuses via wired communication or wireless communication.

The engine 58 is a generic term for various driving devices for operating the image forming apparatus 50. The engine 58 operates under the control by the CPU 51 and the like.

Functional Configuration of Management Server 10 According to First Embodiment

Figure 7:
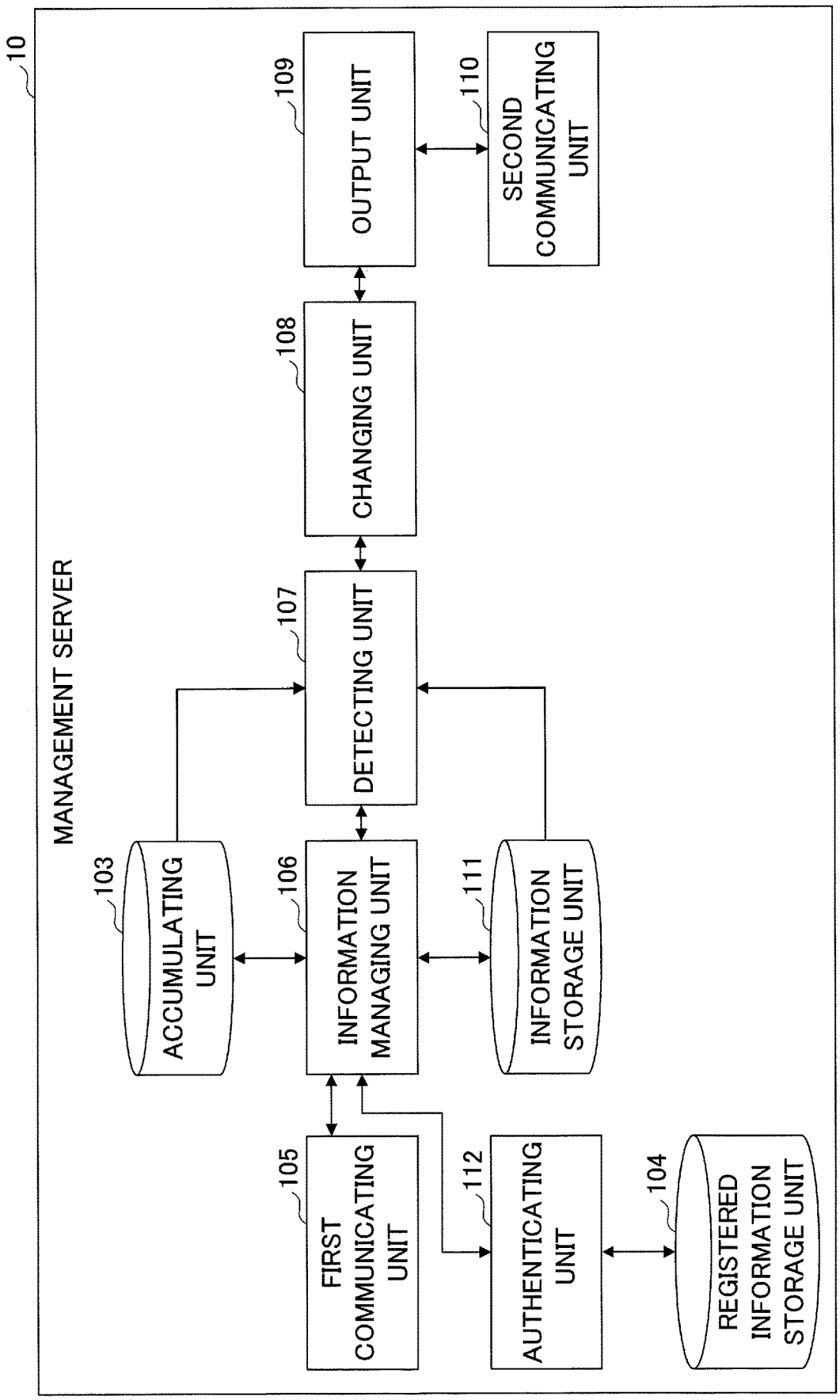
FIG. 7 is a block diagram illustrating an example of a functional configuration of the management server according to the first embodiment of the present invention.

The functional configuration of the management server 10 will be described. FIG. 7 is a block diagram illustrating an example of the functional configuration of the management server 10 according to the first embodiment. As illustrated in FIG. 7, the management server 10 includes, as functional elements, an accumulating unit 103, a registered information storage unit 104, a first communicating unit 105, an information managing unit 106, a detecting unit 107, a changing unit 108, an output unit 109, a second communicating unit 110, an information storage unit 111, and an authenticating unit 112.

The functions of the first communicating unit 105 and the second communicating unit 110 are implemented by the I/F device 17, the CPU 11, and the like. The first communicating unit 105 and the second communicating unit 110 control communication with other apparatuses via the communication network 60. The first communicating unit 105 communicates with the terminal 40 via the communication network 60, and the second communicating unit 110 communicates with the image forming apparatus 50 via the communication network 60.

The function of the accumulating unit 103 is implemented by the memory 14 and the like. In the accumulating unit 103, various print rules are accumulated. The accumulating unit 103 enables storage of print rules and retrieval of the stored print rules. For example, the management terminal 20 stores the print rule in the accumulating unit 103. The print rule may be data created by the management terminal 20 or data input to the management terminal 20 from an external device. The detecting unit 107 retrieves data of any stored print rule, from the accumulating unit 103.

The function of the registered information storage unit 104 is implemented by the memory 14 and the like. The registered information storage unit 104 stores various kinds of information registered in the information processing system 1. The registered information storage unit 104 enables storage of the registered information and retrieval of the stored registered information. The registered information includes information of the management terminal 20, the terminal 40, the image forming apparatus 50, the user of the terminal 40, the user of the image forming apparatus 50, and the like, registered in the information processing system 1. An example of registered information is identification information such as the ID and password of each apparatus and each user. The user may be anyone, as long as the user can be registered in the information processing system 1. For example, the user may be an individual, a group, an organization, and the like.

The functions of the information managing unit 106, the detecting unit 107, the changing unit 108, the output unit 109, and the authenticating unit 112 are implemented by the CPU 11 and the like. The function of the information storage unit 111 is implemented by the memory 14 and the like.

The information managing unit 106 manages information received via the first communicating unit 105. For example, the information managing unit 106 stores the print rule received via the first communicating unit 105, in the information storage unit 111 and/or outputs the print rule to the detecting unit 107. Specifically, the information managing unit 106 acquires, from the accumulating unit 103, a print rule requested by the detecting unit 107, in response to a request from the detecting unit 107.

The information managing unit 106 stores a print job received via the first communicating unit 105, in the information storage unit 111 and/or outputs the print job to the detecting unit 107.

The information managing unit 106 acquires terminal identification information with respect to the terminal 40 together with the print job, via the first communicating unit 105. The information managing unit 106 outputs the terminal identification information to the authenticating unit 112 and causes the authenticating unit 112 to perform authentication of the terminal identification information.

The authenticating unit 112 performs authentication of the terminal identification information by using the registered information storage unit 104. The authenticating unit 112 searches the identification information stored in the registered information storage unit 104, and confirms whether the terminal identification information is registered. The authenticating unit 112 outputs, to the information managing unit 106, an authentication result of authentication successful indicating that the terminal identification information is registered or authentication unsuccessful indicating that the terminal identification information is not registered. For example, the authentication may be performed for allowing the terminal 40 and/or a user of the terminal 40 to use the information processing system 1.

The detecting unit 107 detects a print rule defining a condition corresponding to a print setting that matches the print setting included in the print job, from among the print rules acquired from the information storage unit 111 by the information managing unit 106.

The detecting unit 107 detects, with respect to each of the print rules acquired from the accumulating unit 103, a print setting that matches the print setting defined as a condition of the print rule, from among the print settings included in the print job. Further, from among the print settings included in the print job, the detecting unit 107 searches for and detects a print setting that does not match any of the print settings (conditions) included in all print rules acquired from the accumulating unit 103. The detecting unit 107 outputs the result of the detection performed as described above, to the changing unit 108.

The changing unit 108 changes the print setting included in the print job based on the print rule, according to the detection result obtained by the detecting unit 107, and outputs the print job including the changed print setting to the output unit 109.

Figure 8:
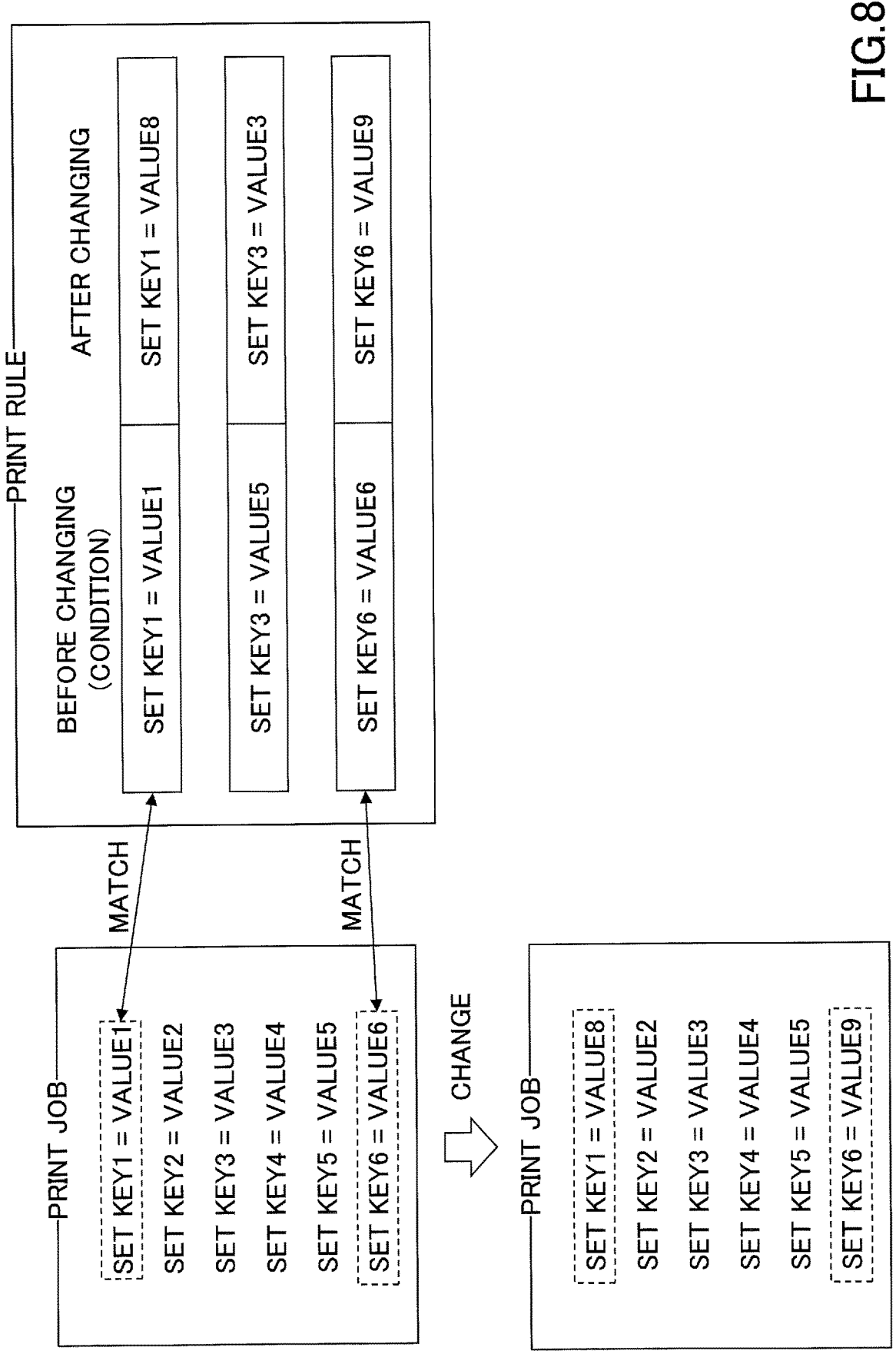
FIG. 8 is a diagram illustrating a process of changing a print setting included in a print job according to the first embodiment of the present invention.

FIG. 8 is a diagram illustrating a process of changing a print setting included in a print job. As illustrated in FIG. 8, in a print rule, a first print setting before the change used for performing the matching determination, and a second print setting after the change, are defined in association with each other. The detecting unit 107 determines whether a print setting included in a print job matches the first print setting. When the detecting unit 107 detects, in the print job, a print setting that matches the first print setting (condition) included in the print rule, the changing unit 108 changes the corresponding print setting to the second print setting (after the change) defined in the print rule. In the example illustrated in FIG. 8, the "SET KEY1=VALUE1" included in the print job is changed to "SET KEY1=VALUE8", and the "SET KEY6=VALUE6" is changed to "SET KEY6=VALUE9".

Accordingly, even when a user of the terminal 40 desires a print rule that is different from the existing print rule stored in the management server 10, it is possible to perform printing according to the desired print rule.

Further, among the print settings included in the print job, when there is a print setting that does not match any of the first print settings set as conditions in the print rule, the changing unit 108 does not change this print setting, but determines this print setting as the print setting of the corresponding print job without changing the print setting.

The output unit 109 transmits the print job changed by the changing unit 108 to the image forming apparatus 50 via the second communicating unit 110.

Note that in the above description, when there is a print setting that does not match any of the first print settings set as conditions in the print rule, the changing unit 108 does not change this print setting; however, the present embodiment is not limited as such. In this case, the changing unit 108 may change the corresponding print setting to a new print setting. In this case, the output unit 109 may request that a new print setting is to be applied to all print jobs in the information processing system 1.

Functional Configuration of Terminal 40 According to First Embodiment

Figure 9:
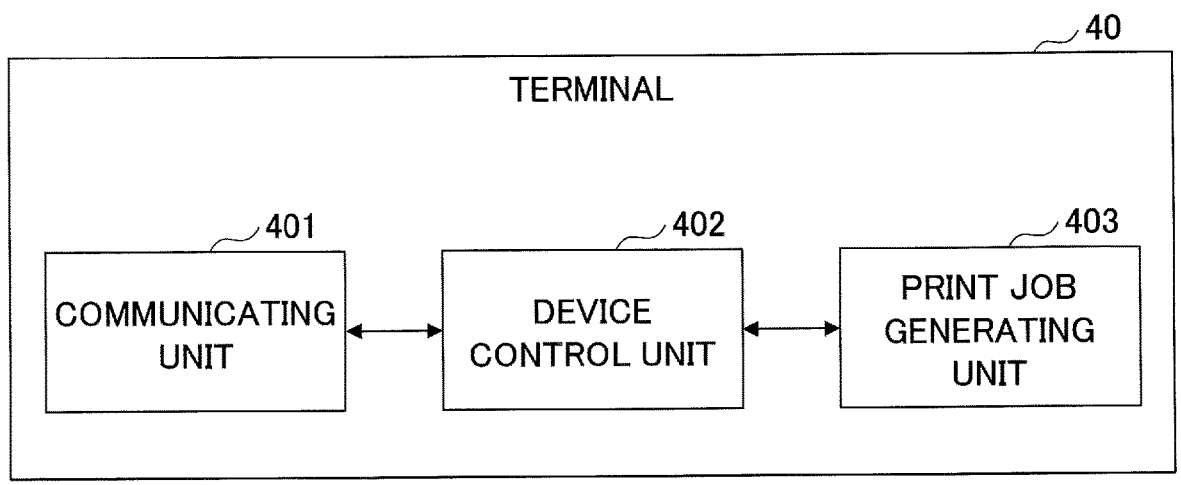
FIG. 9 is a block diagram illustrating an example of a functional configuration of the terminal according to the first embodiment of the present invention.

The functional configuration of the terminal 40 will be described. FIG. 9 is a block diagram illustrating an example of the functional configuration of the terminal 40 according to the first embodiment. As illustrated in FIG. 9, the terminal 40 includes, as functional elements, a communicating unit 401, a device control unit 402, and a print job generating unit 403.

The function of the communicating unit 401 is implemented by the I/F device 47, the CPU 41, and the like. The communicating unit 401 controls communication with other apparatuses via the communication network 60. For example, the communicating unit 401 transmits a print job.

The function of the device control unit 402 is implemented by the CPU 41 and the like. The device control unit 402 controls the operations of the respective units of the terminal 40, and the overall operation of the terminal 40. For example, the device control unit 402 transmits a print job generated by the print job generating unit 403 to the management server 10 via the communicating unit 401.

The function of the print job generating unit 403 is implemented by the CPU 41 and the like. The print job generating unit 403 generates a print job for printing various kinds of data as an image on a recording medium. The print job generating unit 403 may generate a print job with respect to data generated by the terminal 40, or may generate a print job with respect to the data input to the terminal 40 from an external device.

Figure 10:
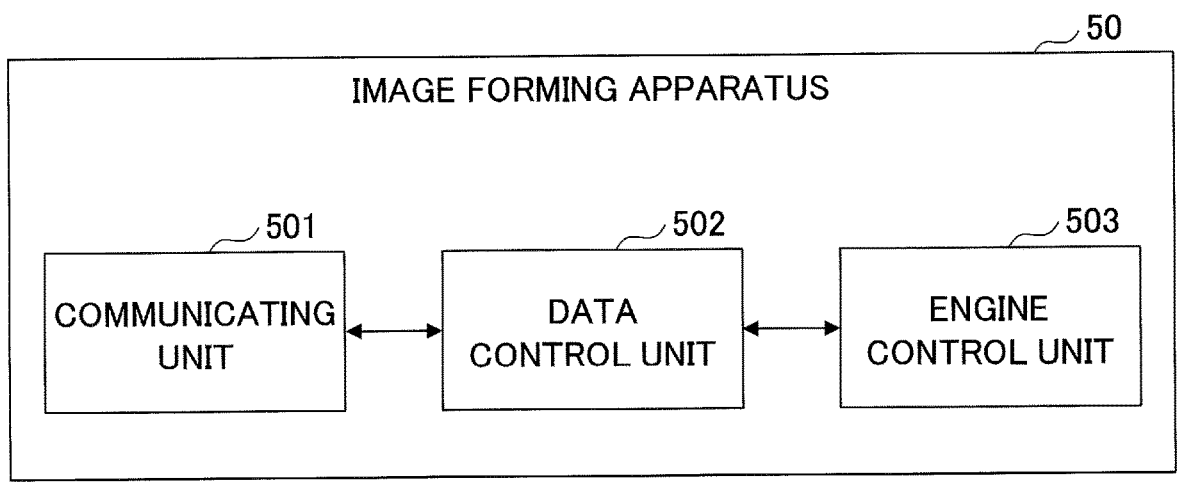
FIG. 10 is a block diagram illustrating an example of a functional configuration of an image forming apparatus according to the first embodiment of the present invention.

Functional Configuration of Image Forming Apparatus 50 According to First Embodiment The functional configuration of the image forming apparatus 50 will be described. FIG. 10 is a block diagram illustrating an example of the functional configuration of the image forming apparatus 50 according to the first embodiment. As illustrated in FIG. 10, the image forming apparatus 50 includes, as functional elements, a communicating unit 501, a data control unit 502, and an engine control unit 503.

The function of the communicating unit 501 is implemented by the I/F device 57, the CPU 51, and the like. The communicating unit 501 controls communication with other apparatuses via the communication network 60. For example, the communicating unit 501 receives a print job.

The function of the data control unit 502 is implemented by the CPU 51 and the like. The data control unit 502 manages and controls the data included in a print job received from the management server 10. For example, the data control unit 502 converts data included in the print job into data suitable for printing at the image forming apparatus 50. Specifically, the data control unit 502 extracts print data from the print job and further extracts a print setting and the like from the print job. For example, when data representing an image to be printed includes an image of a plurality of pages, the data control unit 502 performs a process of dividing the data into a plurality of pages, based on the print setting. The data control unit 502 outputs the data after processing and the print setting in association with each other to the engine control unit 503.

The engine control unit 503 controls the operation of the engine 58 and performs printing on the recording medium, according to the data and the print setting received from the data control unit 502.

Operation of Information Processing System 1 According to First Embodiment

Figure 11:
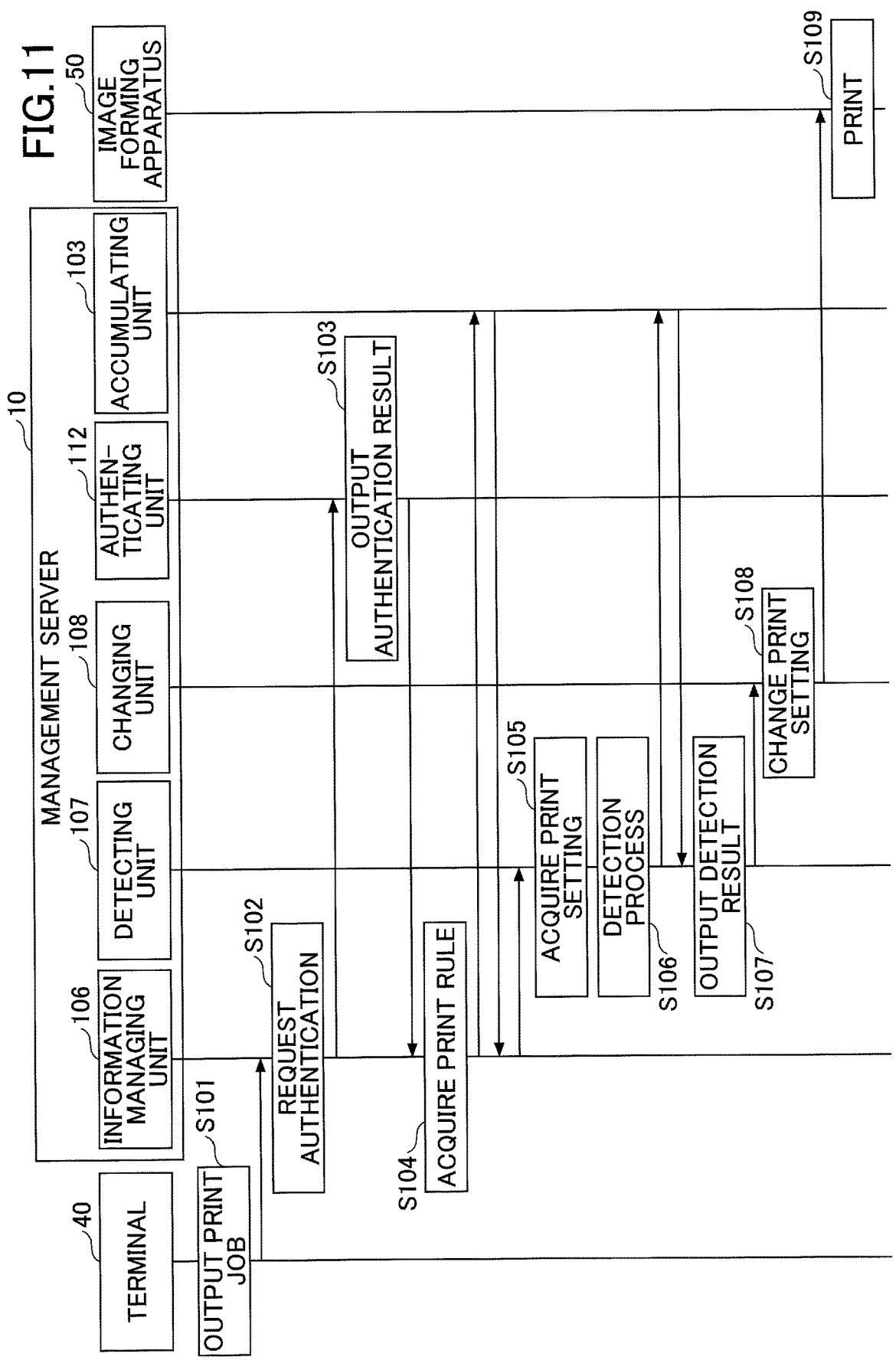
FIG. 11 is a sequence diagram illustrating an example of an operation of the information processing system according to the first embodiment of the present invention.

The operation of the information processing system 1 will be described. FIG. 11 is a sequence diagram illustrating an example of an operation of the information processing system 1 according to the first embodiment. As illustrated in FIG. 11, in step S101, the terminal 40 outputs a print job and transmits the print job to the management server 10. In this example, the print job will be described as including terminal identification information with respect to the terminal 40.

Next, in step S102, the information managing unit 106 of the management server 10 requests the authenticating unit 112 to authenticate the terminal identification information included in the print job.

Next, in step S103, the authenticating unit 112 confirms whether the terminal identification information is registered in the registered information storage unit 104, and outputs an authentication result that is the confirmation result to the information managing unit 106.

Next, in step S104, when information indicating authentication unsuccessful is received, the information managing unit 106 reports this received information and information indicating that printing is not possible, to the terminal 40. When the information managing unit 106 receives the information indicating authentication successful, the information managing unit 106 acquires a print rule accumulated in the accumulating unit 103. The processes from step S105 and onwards are processes performed when the authentication is successful.

Next, in step S105, the detecting unit 107 extracts a print setting from the print job. Next, in step S106, the detecting unit 107 detects, with respect to each print rule acquired from the accumulating unit 103, a print setting among the print settings included in the print job, that matches the print setting defined as a condition in the print rule.

Next, in step S107, the detecting unit 107 outputs the detection result obtained in step S106, to the changing unit 108.

Next, in step S108, the changing unit 108 changes the print setting included in the print job based on the print rule, according to the detection result obtained by the detecting unit 107. The output unit 109 transmits the print job, in which the print setting has been changed, to the image forming apparatus 50.

Next, in step S109, the image forming apparatus 50 prints the print data included in the received print job on a recording medium, according to the print setting.

Effects of First Embodiment

According to the above-described embodiment, even when a user of the terminal 40 desires a print rule different from the existing print rule stored in the management server 10, it is possible to perform printing according to the desired print rule. Accordingly, the information processing system 1 simplifies the operation of changing of the print rule.

Modified Example of First Embodiment

In the first embodiment, direct printing is performed on the print job output from the terminal 40, while in the present modified example, secure printing is performed on the print job output from the terminal 40. Hereinafter, a description of the present modified example will be given focusing on points that are different from that of the first embodiment, and descriptions of the same points will be omitted accordingly.

Configuration According to Modified Example of First Embodiment

The configuration of the information processing system according to the present modified example will be described. The information processing system according to the present modified example includes a management server 10A, the management terminal 20, the terminal 40, and an image forming apparatus 50A. The management server 10A, the management terminal 20, the terminal 40, and the image forming apparatus 50A communicate with each other via a second communication network. The configurations and operations of the management terminal 20, the terminal 40, and the image forming apparatus 50A are the same as those of the corresponding apparatuses of the first embodiment. The hardware configurations of the management server 10A and the image forming apparatus 50A are the same as those of the corresponding apparatuses of the first embodiment.

Figure 12:
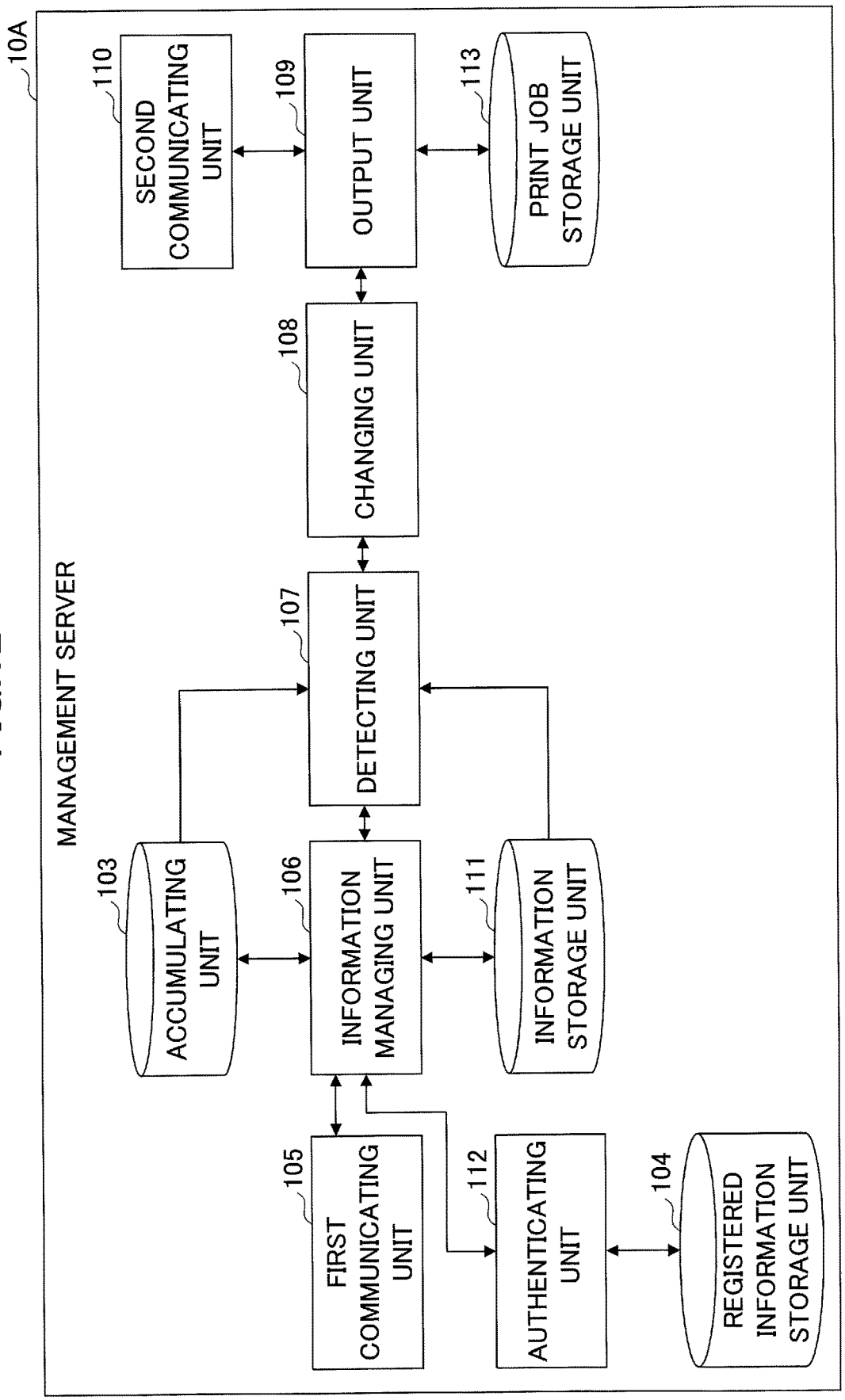
FIG. 12 is a block diagram illustrating a functional configuration of a management server according to a modified example of the first embodiment of the present invention.

FIG. 12 is a block diagram illustrating the functional configuration of the management server 10A according to the modified example of the first embodiment. As illustrated in FIG. 12, the management server 10A further includes a print job storage unit 113, as compared to the management server 10 of the first embodiment.

The function of the print job storage unit 113 is implemented by the memory 14 and the like. The print job storage unit 113 stores and saves a print job, in which a print setting changed by the changing unit 108 and print data to which the print setting is to be applied, are associated with each other. For example, the print job is held in the print job storage unit 113 until a request for printing is received from the image forming apparatus 50A.

Figure 13:
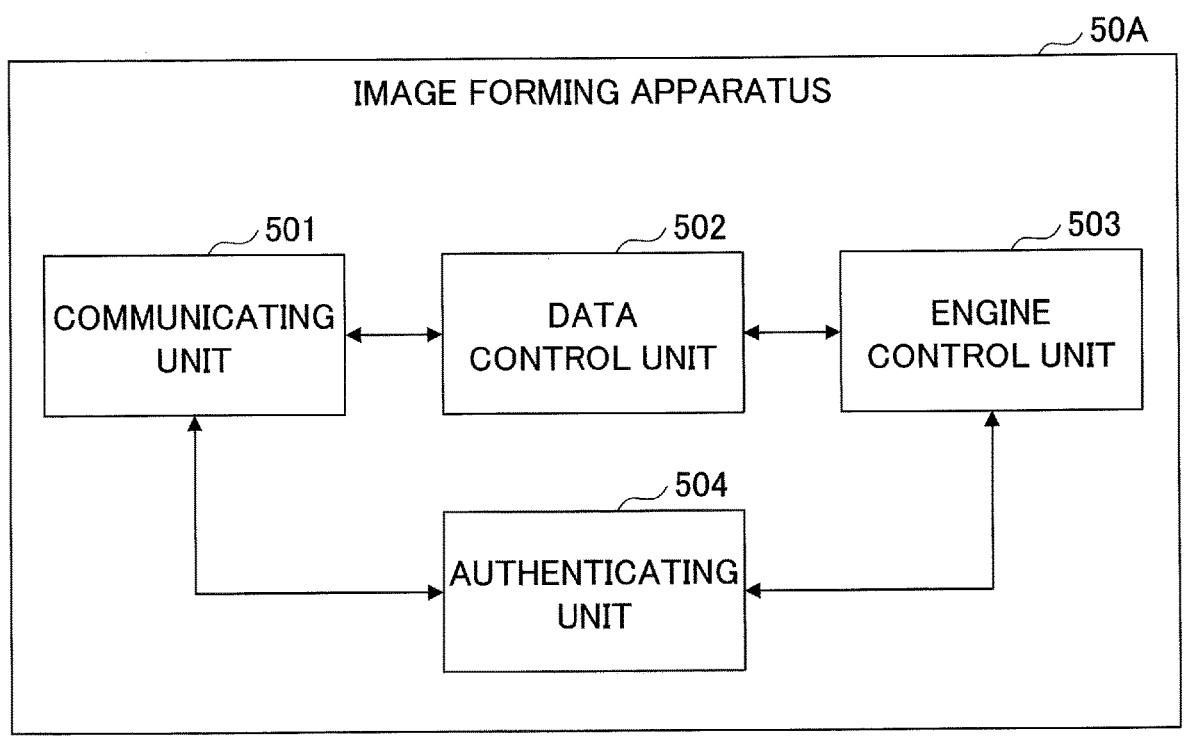
FIG. 13 is a block diagram illustrating an example of a functional configuration of an image forming apparatus according to the modified example of the first embodiment of the present invention.

FIG. 13 is a block diagram illustrating an example of the functional configuration of the image forming apparatus 50A according to the modified example of the first embodiment. As illustrated in FIG. 13, the image forming apparatus 50A further includes an authenticating unit 504 compared to the image forming apparatus 50 of the first embodiment.

The function of the authenticating unit 504 is implemented by the CPU 51 and the like. The authenticating unit 504 performs authentication of the identification information of the user by using the management server 10A. Specifically, the authenticating unit 504 confirms whether the identification information of the user input to the image forming apparatus 50A is registered with respect to the image forming apparatus 50A. At this time, the authenticating unit 504 acquires the identification information of the user input to the image forming apparatus 50A and transmits the acquired identification information to the management server 10A. Authentication of the identification information is performed by the management server 10A. The authenticating unit 504 acquires the authentication result from the management server 10A and displays the authentication result on the display device 55. Note that the identification information may be acquired by the authenticating unit 504 by having the user input the identification information to the operation device 56, or by having the user cause a reading device (not illustrated) of the image forming apparatus 50A read a medium to be read including the identification information. In the present modified example, the medium to be read is a card-shaped medium, although not limited thereto.

The medium to be read may be configured to be read by a reading device of any type, such as a contact type, a non-contact type, an optical type, or a magnetic type. For example, in a contact type, the medium to be read may include an integrated circuit (IC) module terminal including the identification information, and the reading device may read the identification information by contacting and communicating with the IC module terminal. In the case of a non-contact type, the medium to be read includes an IC chip including the identification information and an antenna, and the reading device may read identification information by wireless communication. In the case of an optical type, the medium to be read includes a bar code and the like including identification information, and the reading device may read the identification information by reflected light of emitted light such as infrared light and the like. In the case of a magnetic type, the medium to be read includes a magnetic tape and the like including identification information, and the reading device may read identification information according to changes in the generated magnetic field.

When the user inputs an instruction to execute the printing to the operation device 56 in a state where a message indicating that the authentication of the user is successful is displayed on the display device 55, that is, in a state where authentication of the user's identification information is successful, the authenticating unit 504 outputs the instruction to the data control unit 502, the engine control unit 503, and the like. Specifically, the authenticating unit 504 outputs, to the data control unit 502, an instruction for allowing execution of processing the print job, and outputs, to the engine control unit 503, an instruction for allowing a printing operation. Note that the data control unit 502 does not execute the processing of the print job until the instruction is received, and the engine control unit 503 does not execute the printing operation until the instruction is received. Further, the authenticating unit 504 transmits an instruction to request a print job to the management server 10A. Accordingly, the print job transmitted from the management server 10A is subjected to a printing process performed by the image forming apparatus 50A.

Operation According to Modified Example of First Embodiment

Figure 14B:
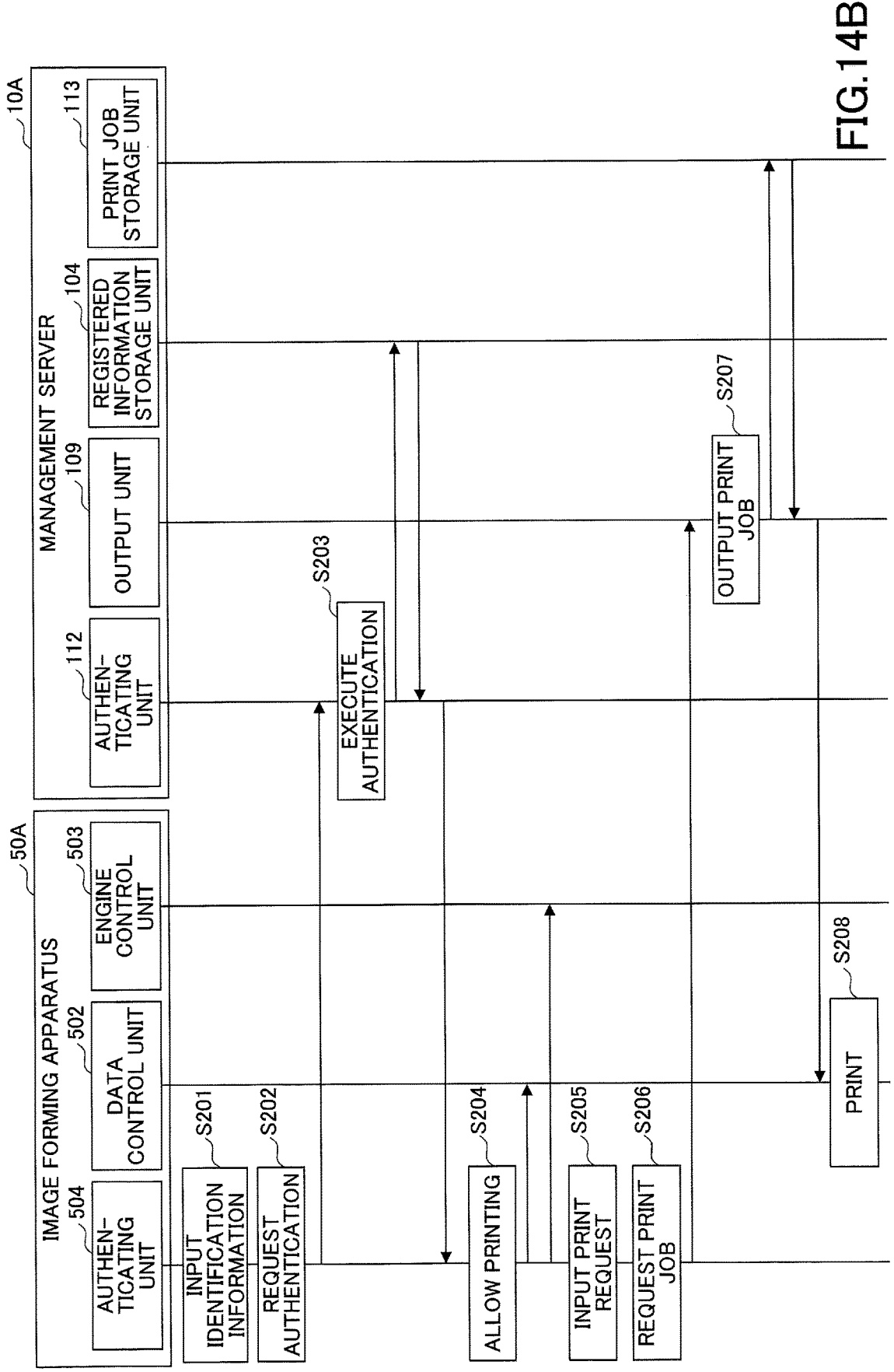
FIG. 14B is a sequence diagram illustrating an example of an operation of the information processing system according to the modified example of the first embodiment of the present invention.

An example of the operation of the information processing system according to the present modified example will be described. FIGS. 14A and 14B are sequence diagrams illustrating an example of an operation of an information processing system according to the present modified example. FIG. 14A illustrates the operation before authentication of the user at the image forming apparatus 50A, and FIG. 14B illustrates the operation after authentication of the user at the image forming apparatus 50A.

As illustrated in FIG. 14A, in step S101, when the terminal 40 outputs a print job to the management server 10A, the management server 10A performs the processes of steps S102 to S108 in the same manner as in the first embodiment. Note that in step S108, the changing unit 108 changes the print setting included in the print job based on the print rule, according to the detection result obtained by the detecting unit 107.

Next, in step S110, the output unit 109 saves and stores, in the print job storage unit 113, the print job including the print setting changed by the changing unit 108 and the print data for which the print setting is to be set.

Then, as illustrated in FIG. 14B, after the user outputs the print job via the terminal 40, the user authentication in secure printing is performed at the image forming apparatus 50A.

First, in step S201, the user inputs identification information of the user to the image forming apparatus 50A.

Next, in step S202, the authenticating unit 504 of the image forming apparatus 50A transmits the input identification information of the user to the management server 10A, and requests the authentication of the identification information.

Next, in step S203, the authenticating unit 112 of the management server 10A searches the identification information of each user stored in the registered information storage unit 104 and confirms whether there is identification information that matches the identification information of the user acquired from the image forming apparatus 50A. That is, the authenticating unit 112 executes the authentication of the user's identification information. The authenticating unit 112 transmits, to the image forming apparatus 50A, an authentication result indicating authentication successful or authentication unsuccessful with respect to the user's identification information.

Next, in step S204, when the acquired authentication result indicates authentication successful, the authenticating unit 504 of the image forming apparatus 50A outputs an instruction of allowing execution of printing, to the data control unit 502 and the engine control unit 503. Further, the authenticating unit 504 may cause the display device 55 to display a message that printing is possible. At this time, the authenticating unit 504 may cause the display device 55 to display a message requesting for an instruction to execute the printing.

On the other hand, when the acquired authentication result indicates authentication unsuccessful, the authenticating unit 504 causes the display device 55 to display a message indicating that printing is not possible. Note that the authenticating unit 504 may cause the display device 55 to display a message requesting the identification information of the user to be input again.

Next, in step S205, when the user inputs an instruction requesting execution of printing to the operation device 56, the authenticating unit 504 acquires the instruction. The processes from step S205 and onwards are the processes performed in the case where authentication is successful in step S203.

Next, in step S206, the authenticating unit 504 transmits an instruction requesting a print job to the management server 10A. At this time, the authenticating unit 504 may transmit the identification information of the user for which the authentication has been successful, together with the instruction.

Next, in step S207, the output unit 109 of the management server 10A extracts the requested print job from the print job storage unit 113 and outputs the print job to the image forming apparatus 50A.

Next, in step S208, the data control unit 502 of the image forming apparatus 50A converts the data included in the received print job into data suitable for printing, and outputs the data to the engine control unit 503 to cause the engine control unit 503 to execute the printing.

Note that in step S204, in a case where the management server 10A cannot acquire an instruction requesting printing from the image forming apparatus 50A even when a predetermined time elapses after receiving the print job in step S101, the print job stored in the print job storage unit 113 may be discarded.

Effects of Modified Example of First Embodiment

According to the present modified example, after the user is authenticated at the image forming apparatus 50A, a print job is transmitted from the management server 10A to the image forming apparatus 50A. That is, secure printing is performed in the information processing system. Even in such secure printing, the operation of changing the print rule is simple.

Second Embodiment

The information processing system according to a second embodiment is different from the first embodiment, in that an intermediate server is provided. Hereinafter, the second embodiment will be described mainly with reference to points different from the first embodiment, and the same points as the first embodiment will be omitted accordingly.

Configuration According to Second Embodiment

Figure 15:
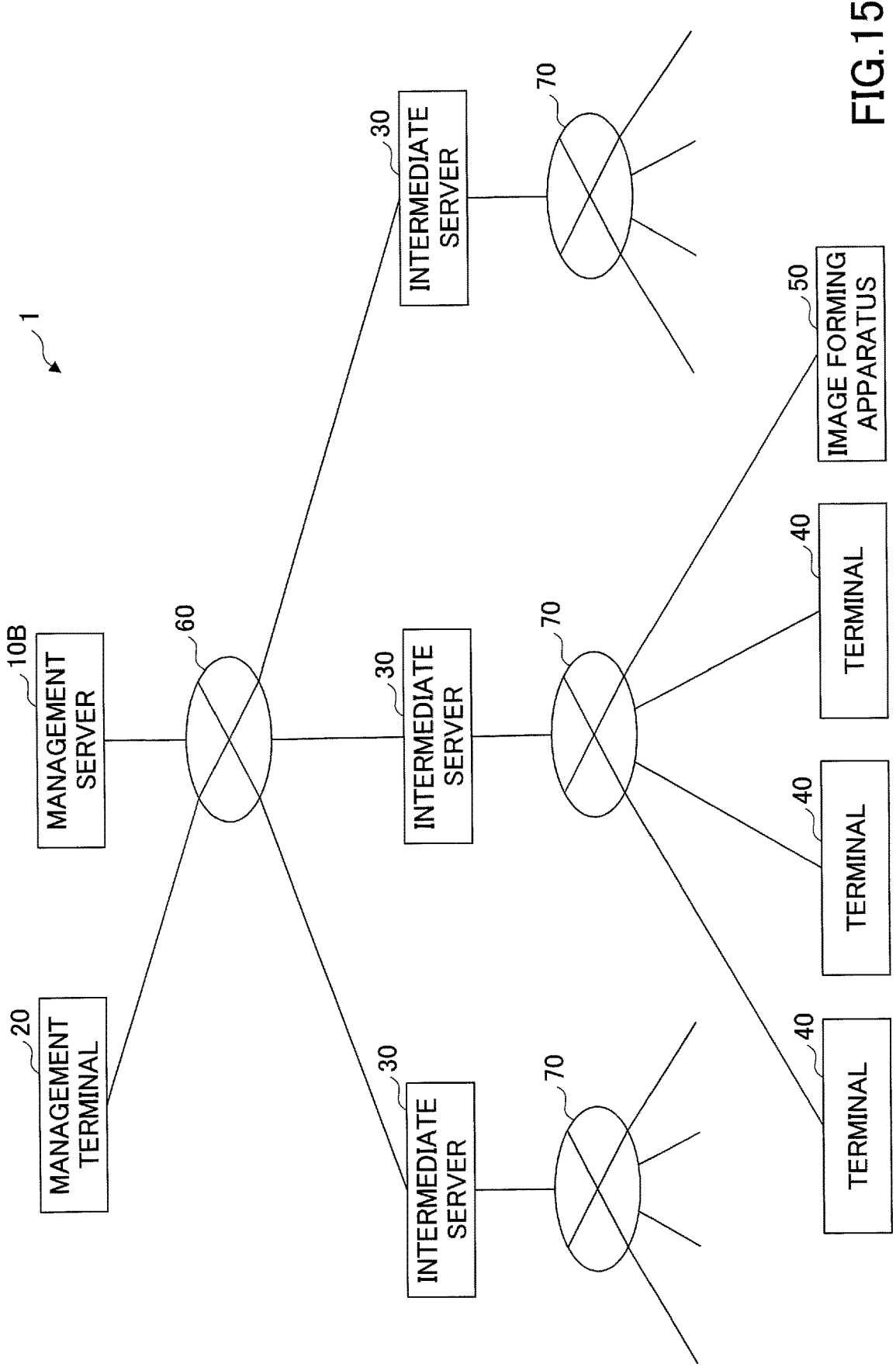
FIG. 15 is a diagram illustrating an example of a configuration of an information processing system according to a second embodiment of the present invention.

FIG. 15 is a diagram illustrating an example of the configuration of an information processing system 1A according to the second embodiment. As illustrated in FIG. 15, the information processing system 1A includes a management server 10B, the management terminal 20, an intermediate server 30, the terminal 40, and the image forming apparatus 50.

The management server 10B, the management terminal 20, and the intermediate server 30 communicate with each other. According to the present embodiment, the management server 10B, the management terminal 20, and the intermediate server 30 communicate with each other via the communication network 60 (hereinafter also referred to as the first communication network 60). Further, the intermediate server 30, the terminal 40, and the image forming apparatus 50 communicate with each other. In the present embodiment, the intermediate server 30, the terminal 40, and the image forming apparatus 50 communicate with each other via a second communication network 70.

In the information processing system 1A, one or more intermediate servers 30 may be disposed with respect to one management server 10B. Further, one or more terminals 40 and one or more image forming apparatuses 50 may be disposed with respect to one intermediate server 30. For example, when the information processing system 1A is provided in a company, the management server 10B may be disposed at a head office, a home store, and the like, and the intermediate server 30 may be disposed at a branch office, a sales office and the like, although not limited as such. The terminal 40 and the image forming apparatus 50 may be disposed at a branch office, a sales office and the like. The information processing system 1A may include one or more management servers 10B, one or more management terminals 20, one or more intermediate servers 30, one or more terminals 40, and one or more image forming apparatuses 50.

The first communication network 60 and the second communication network 70 are, for example, intranets. In the present embodiment, the first communication network 60 and the second communication network 70 are configured as separate communication networks; however, these communication networks may be the same communication network.

The management server 10B and the intermediate server 30 are information processing apparatuses having a communication function. The management server 10B holds information and the like for managing the information processing system 1A. For example, the management server 10B holds a print rule that is a rule for forming an image on a recording medium by the image forming apparatus 50. The print rule may be a common rule within the information processing system 1A, a rule set for each intermediate server 30, a rule set for each terminal 40, or a rule set for each user of the terminal 40.

The intermediate server 30 functions as a print server that manages data, and the like, of an image to be formed on a recording medium and transmits the data to the image forming apparatus 50 based on a request from the terminal 40 or the image forming apparatus 50. In the present embodiment, an example of the management server 10B and the intermediate server 30 is a computer apparatus.

Hardware Configuration of Intermediate Server 30 According to Second Embodiment

Figure 16:
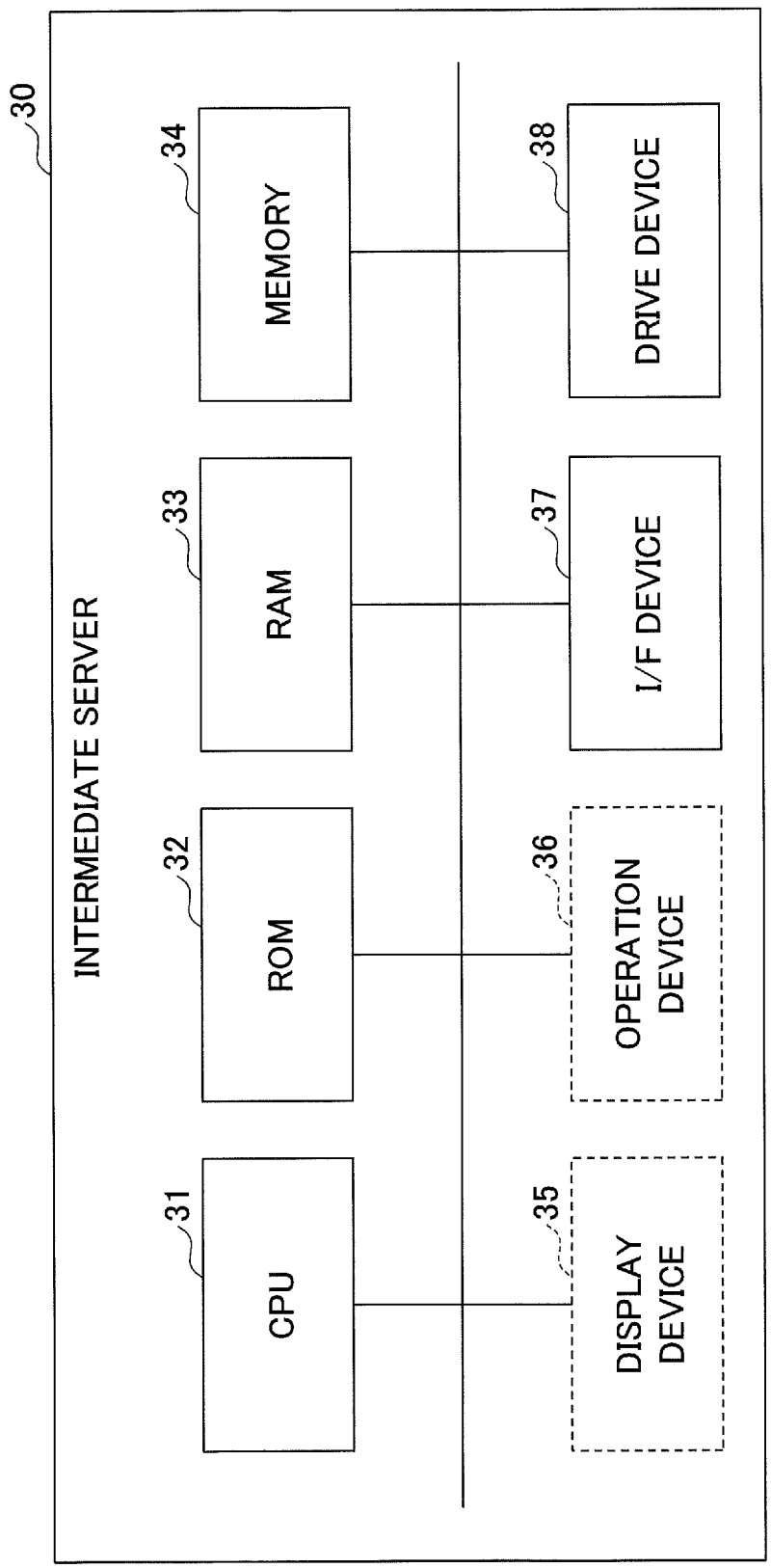
FIG. 16 is a block diagram illustrating an example of a hardware configuration of an intermediate server according to the second embodiment of the present invention.

FIG. 16 is a block diagram illustrating an example of the hardware configuration of the intermediate server 30 according to the second embodiment. As illustrated in FIG. 16, the intermediate server 30 includes, as elements, a CPU 31, a ROM 32, a RAM 33, a memory 34, a display device 35, an operation device 36, an interface device 37, and a drive device 38.

The configurations and functions of the CPU 31, the ROM 32, the RAM 33, the memory 34, the display device 35, the operation device 36, the I/F device 37, and the drive device 38 are respectively, the same as those of the CPU 11, the ROM 12, the RAM 13, the memory 14, the display device 15, the operation device 16, the I/F device 17, and the drive device 18, illustrated in FIG. 4, and thus descriptions thereof are omitted.

The I/F device 37 is a connection device for connecting to the first communication network 60, the second communication network 70, and other apparatuses. The I/F device 37 is connected to the management server 10B and other apparatuses via the first communication network 60, and is connected to the terminal 40, the image forming apparatus 50, and other apparatuses via the second communication network 70. Further, the I/F device 37 is connected to another apparatus via wired communication or wireless communication.

Figure 17:
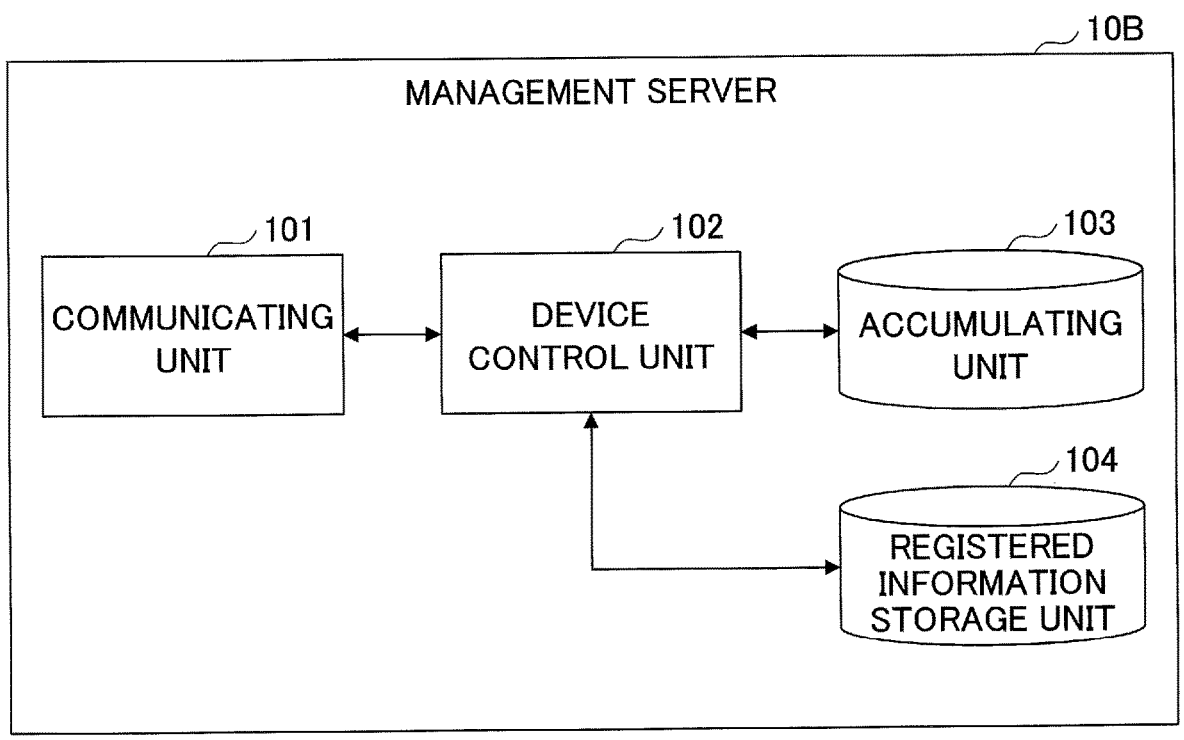
FIG. 17 is a block diagram illustrating an example of a functional configuration of a management server according to the second embodiment of the present invention.

Functional Configuration of Management Server 10B According to Second Embodiment FIG. 17 is a block diagram illustrating an example of the functional configuration of the management server 10B according to the second embodiment. As illustrated in FIG. 17, the management server 10B according to the second embodiment includes, as functional elements, a communicating unit 101, a device control unit 102, the accumulating unit 103, and the registered information storage unit 104.

The accumulating unit 103 and the registered information storage unit 104 respectively have the same configurations as the accumulating unit 103 and the registered information storage unit 104 included in the management server 10B according to the first embodiment.

The function of the communicating unit 101 is implemented by the I/F device 17, the CPU 11, and the like. The communicating unit 101 controls communication with other apparatuses via the first communication network 60. For example, the communicating unit 101 transmits and receives a print rule.

The function of the device control unit 102 is implemented by the CPU 11 and the like. The device control unit 102 controls the operations of the respective units of the management server 10B, and the overall operation of the management server 10B. For example, the device control unit 102 controls the storing and the retrieving of information in the accumulating unit 103 and the registered information storage unit 104.

Figure 18:
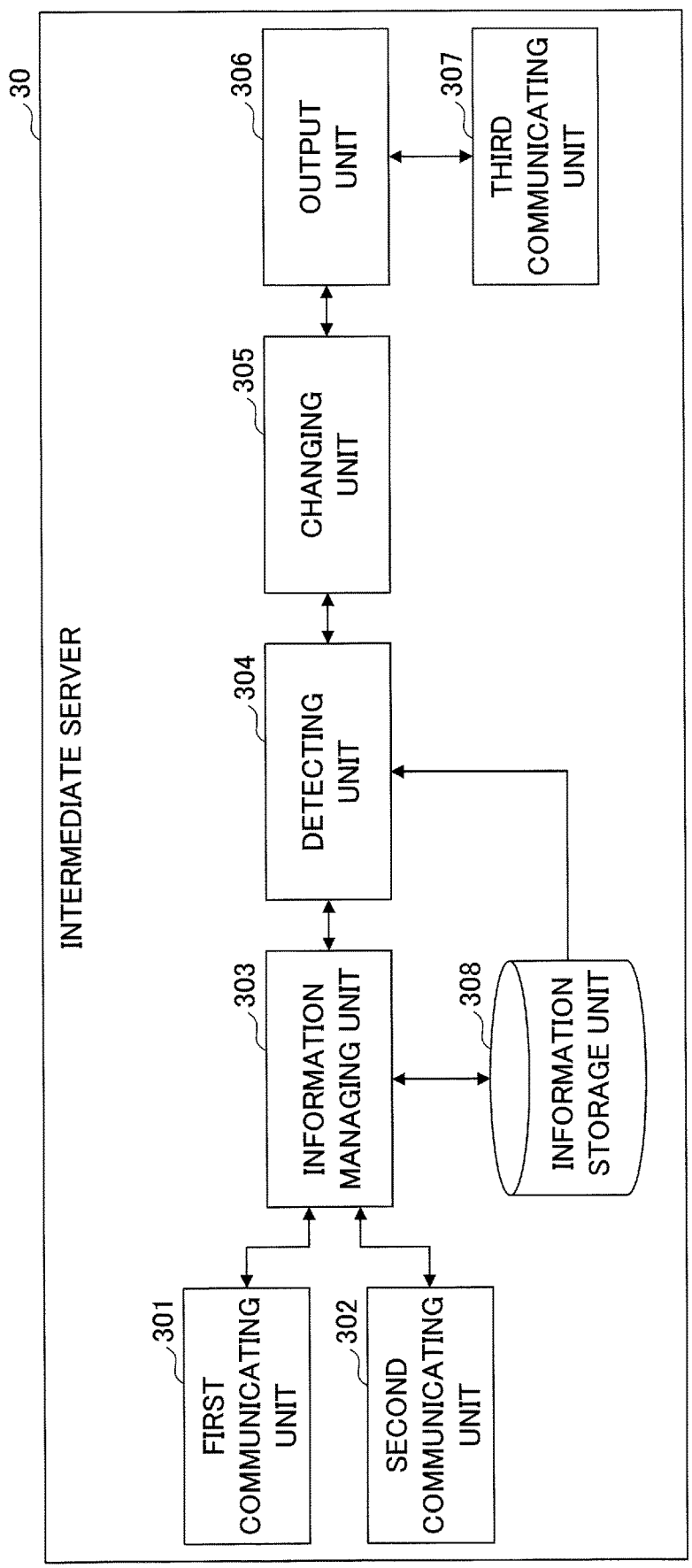
FIG. 18 is a block diagram illustrating an example of a functional configuration of an intermediate server according to the second embodiment of the present invention.

Functional Configuration of Intermediate Server 30 According to Second Embodiment FIG. 18 is a block diagram illustrating an example of the functional configuration of the intermediate server 30 according to the second embodiment. As illustrated in FIG. 18, the intermediate server 30 includes, as functional elements, a first communicating unit 301, a second communicating unit 302, an information managing unit 303, a detecting unit 304, a changing unit 305, an output unit 306, a third communicating unit 307, and an information storage unit 308.

The information managing unit 303, the detecting unit 304, the changing unit 305, and the output unit 306 respectively have the same configurations as the information managing unit 106, the detecting unit 107, the changing unit 108, and the output unit 109 included in the management server 10B according to the first embodiment.

The functions of the first communicating unit 301, the second communicating unit 302, and the third communicating unit 307 are implemented by the I/F device 37, the CPU 31, and the like. The first communicating unit 301 controls communication with the management server 10B via the first communication network 60. For example, the first communicating unit 301 transmits and receives a print rule. The second communicating unit 302 controls communication with the terminal 40 via the second communication network 70. For example, the second communicating unit 302 transmits and receives a print job. The third communicating unit 307 controls communication with the image forming apparatus 50 via the second communication network 70. For example, the third communicating unit 307 transmits and receives a print job.

In the present embodiment, the information managing unit 303 stores a print rule received via the first communicating unit 301 in the information storage unit 308 and/or outputs the print rule to the detecting unit 304. Specifically, the information managing unit 303 sends a query to the management server 10B in response to a request from the detecting unit 304 and acquires the print rule requested by the detecting unit 304 from the management server 10B.

The information managing unit 303 stores a print job received via the second communicating unit 302 in the information storage unit 308 and/or outputs the print job to the detecting unit 304. In the present embodiment, the information managing unit 303 transmits the terminal identification information to the management server 10B via the first communicating unit 301, and acquires, from the management server 10B, the authentication result of whether the terminal identification information is registered in the registered information storage unit 104.

According to the present embodiment, the detecting unit 304 detects, with respect to each of the print rules acquired from the management server 10B, a print setting that matches the print setting corresponding to a condition of the print rule, from among the print settings included in the print job.

The function of the changing unit 305 is the same as that of the changing unit 108 according to the first embodiment, and, therefore, the description thereof will be omitted. The output unit 306 transmits the print job changed by the changing unit 305 to the image forming apparatus 50 via the third communicating unit 307.

Operation According to Second Embodiment

Figure 19:
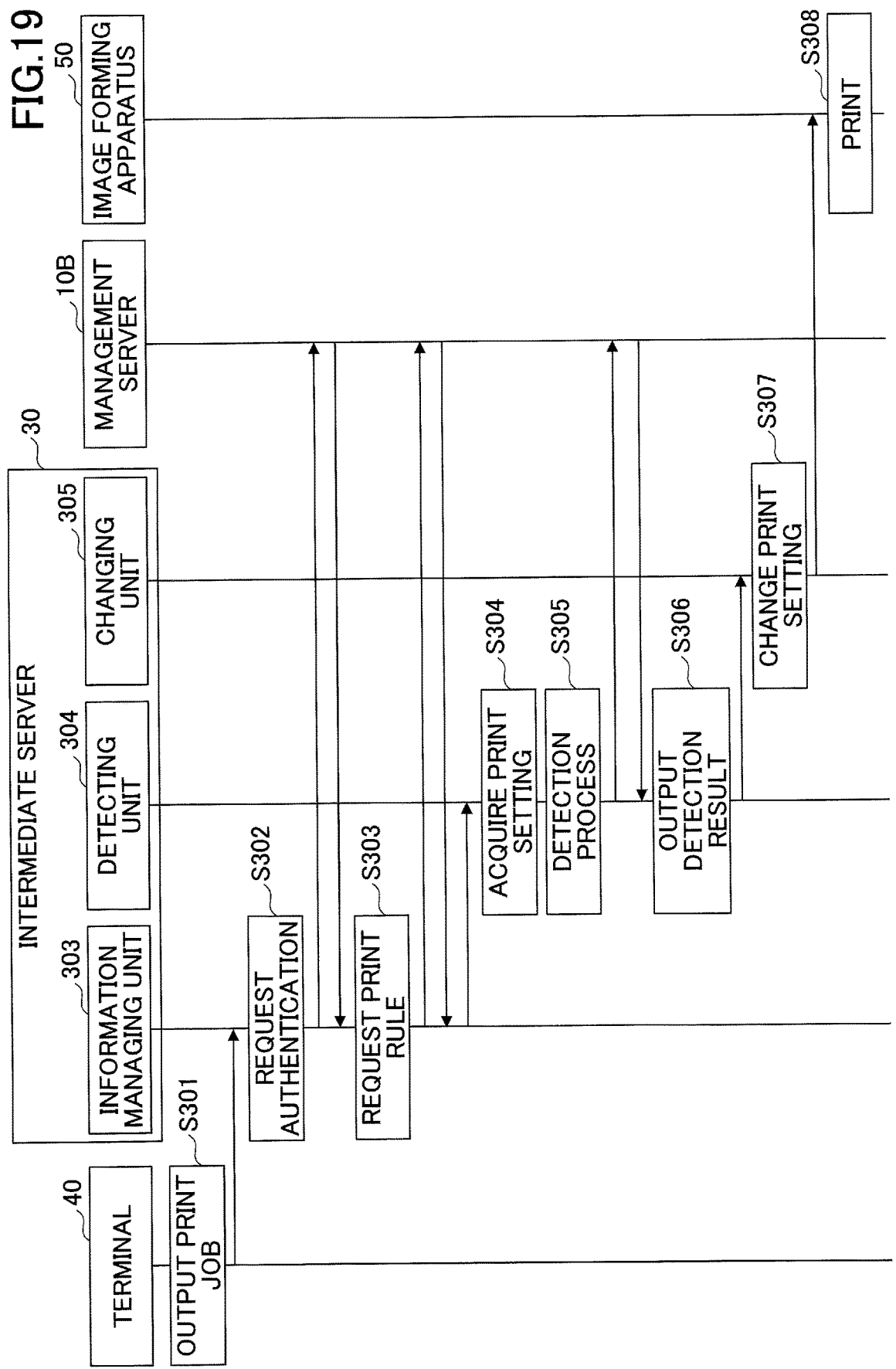
FIG. 19 is a sequence diagram illustrating an example of an operation of the information processing system according to the second embodiment of the present invention.

An operation of the information processing system 1A according to the second embodiment will be described. FIG. 19 is a sequence diagram illustrating an example of an operation of the information processing system 1A according to the second embodiment. As illustrated in FIG. 19, in step S301, the terminal 40 outputs a print job and transmits the print job to the intermediate server 30.

Next, in step S302, the information managing unit 303 of the intermediate server 30 requests the management server 10B to authenticate the terminal identification information included in the print job. Specifically, the information managing unit 303 transmits the terminal identification information to the management server 10B. The management server 10B confirms whether the received terminal identification information is registered in the registered information storage unit 104, and outputs an authentication result that is the confirmation result to the information managing unit 303.

Then, in step S303, when information indicating authentication unsuccessful is received, the information managing unit 303 reports, to the terminal 40, the received information and information indicating that printing is not possible. At this time, the terminal 40 may cause the display device 45 to display a screen indicating authentication unsuccessful or printing is not possible.

When the information managing unit 303 receives information indicating authentication successful, the information managing unit 303 requests the management server 10B for the print rules accumulated in the accumulating unit 103. The management server 10B transmits all of the print rules in the accumulating unit 103 to the intermediate server 30. The information managing unit 303 stores the print rules received from the management server 10B in the information storage unit 308. The information managing unit 303 may sequentially acquire the print rules according to the processing situation.

Next, the intermediate server 30 performs the processes of steps S304 to S307 in the same manner as the first embodiment. In step S307, the changing unit 305 changes the print setting included in the print job based on the print rule according to the detection result obtained by the detecting unit 304. The output unit 306 transmits the print job in which the print setting has been changed, to the image forming apparatus 50.

Next, in step S308, the image forming apparatus 50 prints the print data included in the received print job on the recording medium according to the print setting.

First Modified Example of Second Embodiment

In the second embodiment, when the terminal 40 outputs the print job to the image forming apparatus 50, the print job is transmitted, without being saved, to the image forming apparatus 50 via the intermediate server 30, and the print job is subjected to a printing process by the image forming apparatus 50. According to a first modified example of the second embodiment, the print job output from the terminal 40 is temporarily saved in the intermediate server 30. The intermediate server 30 reads out the saved print job according to need and uses the print job. Hereinafter, the first modified example will be described focusing on points different from the second embodiment, and the same points as the second embodiment will be omitted accordingly.

Figure 20:
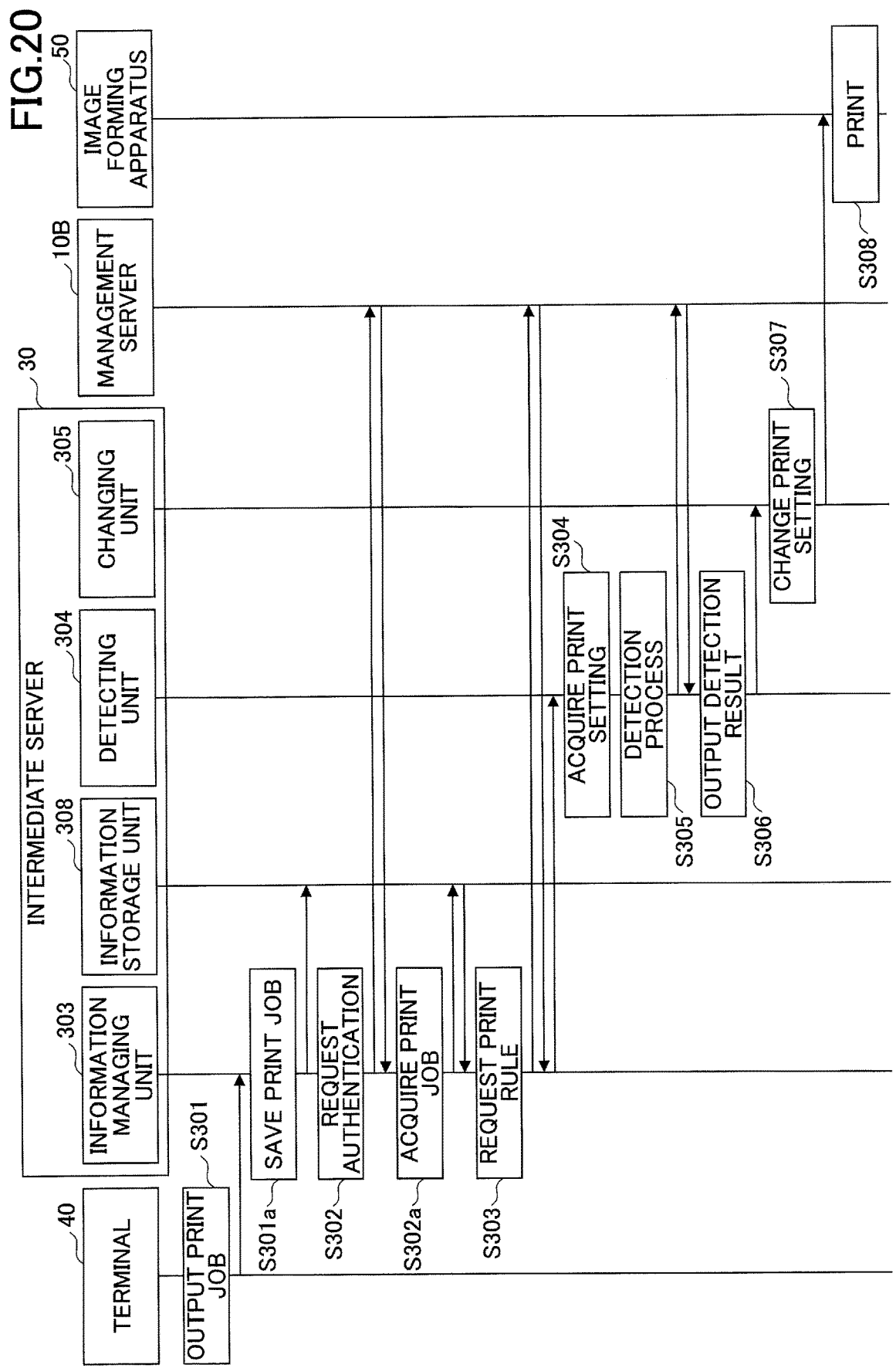
FIG. 20 is a sequence diagram illustrating an example of an operation of an information processing system according to a first modified example of the second embodiment.

The configuration of the information processing system according to the present modified example is the same as that of the second embodiment. FIG. 20 is a sequence diagram illustrating an example of an operation of the information processing system according to the first modified example of the second embodiment. As illustrated in FIG. 20, in step S301, the terminal 40 outputs a print job to the intermediate server 30.

Next, in step S301*a*, the intermediate server 30 saves the received print job in the information storage unit 308.

Next, in step S302, similar to the second embodiment, the information managing unit 303 requests the management server 10B to authenticate the terminal identification information included in the print job.

Next, in step S302*a*, the information managing unit 303 reads (acquires) the print job corresponding to the terminal identification information for which the authentication has been successful, from the information storage unit 308. Note that when the authentication is unsuccessful, the information managing unit 303 reports, to the terminal 40, information indicating authentication unsuccessful and information indicating that printing is not possible.

Then, in step S303, the information managing unit 303 requests the management server 10B for the print rules accumulated in the accumulating unit 103. The processes from step S303 and onwards are the processes when the authentication is successful. Further, the processes of steps S304 to S308 are the same as those of the second embodiment.

Second Modified Example of Second Embodiment

According to a second modified example of the second embodiment, when the terminal outputs the print job to the image forming apparatus, the print job is temporarily held by an intermediate server and the like. Further, after the output of the print job, the user is authenticated at the image forming apparatus. After the user is authenticated, the print job is transmitted to the image forming apparatus and a printing process (secure printing) is performed by the image forming apparatus. Hereinafter, a description of the present modified example will be given focusing on points that are different from that of the second embodiment, and a description of the same points will be omitted accordingly.

The configuration of the information processing system according to the present modified example will be described. The information processing system according to the present modified example includes the management server 10B, the management terminal 20, an intermediate server 30A, the terminal 40, and the image forming apparatus 50A. The configurations and operations of the management server 10B, the management terminal 20, and the terminal 40 are the same as those of the second embodiment. The configuration of the image forming apparatus 50A is the same as that of the second embodiment.

Figure 21:
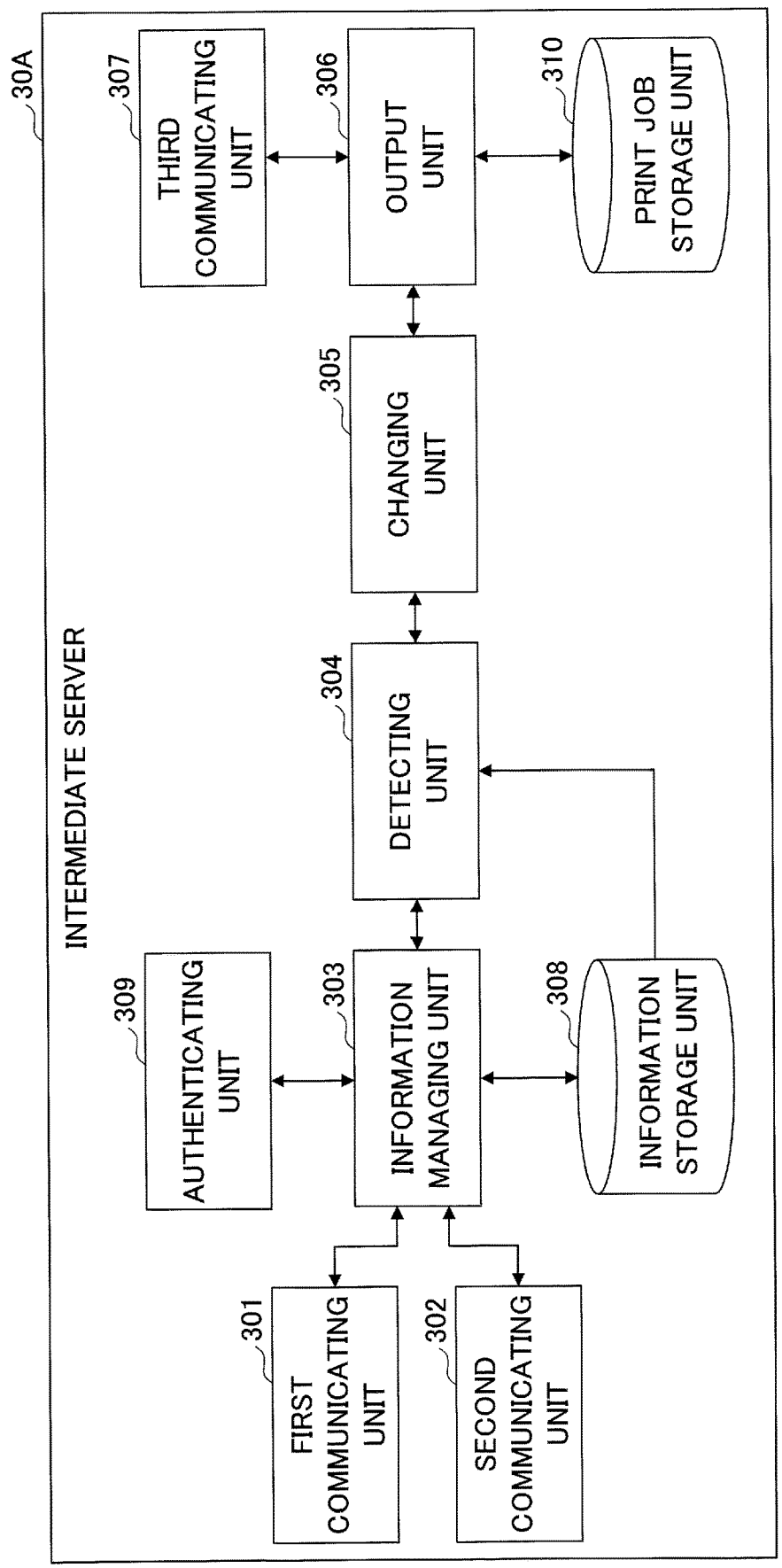
FIG. 21 is a block diagram illustrating an example of a functional configuration of an intermediate server according to a second modified example of the second embodiment.

FIG. 21 is a block diagram illustrating an example of the functional configuration of the intermediate server 30A according to the second modified example of the second embodiment. As illustrated in FIG. 21, the intermediate server 30A further includes an authenticating unit 309 and a print job storage unit 310 as compared to the intermediate server 30 of the second embodiment.

The function of the authenticating unit 309 is implemented by the CPU 31 and the like. The authenticating unit 309 authenticates the identification information of the user acquired from the image forming apparatus 50A, by using the management server 10B. Specifically, the authenticating unit 309 acquires the identification information of the user from the image forming apparatus 50A via the third communicating unit 307. The authenticating unit 309 transmits the identification information to the management server 10B via the first communicating unit 301 to acquire, from the management server 10B, the authentication result of whether the identification information is registered in the registered information storage unit 104. When the identification information is registered in the registered information storage unit 104, the identification information is authenticated, and when the identification information is not registered in the registered information storage unit 104, the identification information is not authenticated. The authenticating unit 309 transmits the authentication result to the image forming apparatus 50A.

The function of the print job storage unit 310 is implemented by the memory 34 and the like. The print job storage unit 310 stores and saves a print job in which the print setting changed by the changing unit 305 and the print data to which the print setting is to be applied are associated with each other. For example, the print job is held in the print job storage unit 310 until a request for printing is received from the image forming apparatus 50A.

Operation of Second Modified Example of Second Embodiment

An example of an operation of the information processing system according to the present modified example will be described. FIGS. 22A and 22B are sequence diagrams illustrating an example of the operation of the information processing system according to the present modified example. FIG. 22A illustrates the operation before the user authentication at the image forming apparatus 50A, and FIG. 22B illustrates the operation after the user authentication at the image forming apparatus 50A.

As illustrated in FIG. 22A, when the terminal 40 outputs the print job to the intermediate server 30A in step S301, the intermediate server 30A performs the processes of steps S302 to S307 in the same manner as in the second embodiment. In step S307, the changing unit 305 changes the print setting included in the print job based on the print rule according to the detection result obtained by the detecting unit 304.

Next, in step S309, the output unit 306 saves and stores the print job including the print setting changed by the changing unit 305 and the print data to which the print setting is to be set, in the print job storage unit 310.

As illustrated in FIG. 22B, after the user outputs the print job via the terminal 40, the user authentication in secure printing is performed at the image forming apparatus 50A. In the present modified example, the user is the same as the user using the terminal 40; however, the user is not limited as such. The user may be another user using the image forming apparatus 50A.

First, in step S401, the user inputs identification information of the user to the image forming apparatus 50A. The user may input identification information to the operation device 56 or may have a reading device of the image forming apparatus 50A read a medium such as a card holding the identification information.

Next, in step S402, the authenticating unit 504 transmits the input identification information of the user to the intermediate server 30A and requests the authentication of the identification information.

Next, in step S403, the authenticating unit 309 of the intermediate server 30A transmits the identification information of the user acquired from the image forming apparatus 50A to the management server 10B and requests the authentication of the identification information. That is, the authenticating unit 309 makes a request for the authentication result as to whether the identification information is registered.

Next, in step S404, the management server 10B searches the identification information of each user stored in the registered information storage unit 104 and confirms whether there is identification information matching the acquired identification information of the user. That is, the management server 10B executes authentication as to whether the identification information of the user is registered. The management server 10B transmits the authentication result indicating authentication successful or authentication unsuccessful with respect to the identification information of the user, to the image forming apparatus 50A via the intermediate server 30A.

The processes of steps S405 to S407 are the same as the processes of steps S204 to S206 according to the modified example of the first embodiment. Note that in step S407, the authenticating unit 504 transmits an instruction requesting a print job, and the like, to the intermediate server 30A.

Next, in step S408, the output unit 306 of the intermediate server 30A extracts the requested print job from the print job storage unit 310 and outputs the print job to the image forming apparatus 50A.

Next, in step S409, the data control unit 502 of the image forming apparatus 50A converts the data included in the received print job into data suitable for printing, and executes printing by outputting the data to the engine control unit 503.

In step S405, in a case where the intermediate server 30A cannot acquire an instruction requesting printing from the image forming apparatus 50A even when a predetermined time elapses after receiving the print job in step S301, due to, for example, an unsuccessful authentication, the print job stored in the print job storage unit 310 may be discarded.

Third Embodiment

The information processing system according to a third embodiment is different from the first and second embodiments in that the intermediate server is not provided, and the terminal also serves as a part of the function of the intermediate server. Hereinafter, a description of the third embodiment will be made focusing on points that are different from the first and second embodiments and the modified examples, and descriptions of the same points will be omitted accordingly.

Configuration According to Third Embodiment

The configuration of the information processing system according to the third embodiment will be described. The information processing system according to the present embodiment includes the management server 10B, the management terminal 20, a terminal 40D, and the image forming apparatus 50. The management server 10B, the management terminal 20, the terminal 40D, and the image forming apparatus 50 communicate with each other via the second communication network 70. The configurations and operations of the management server 10B, the management terminal 20, and the image forming apparatus 50 are the same as those of the second embodiment. The hardware configuration of the terminal 40D is the same as that of the second embodiment.

Figure 23:
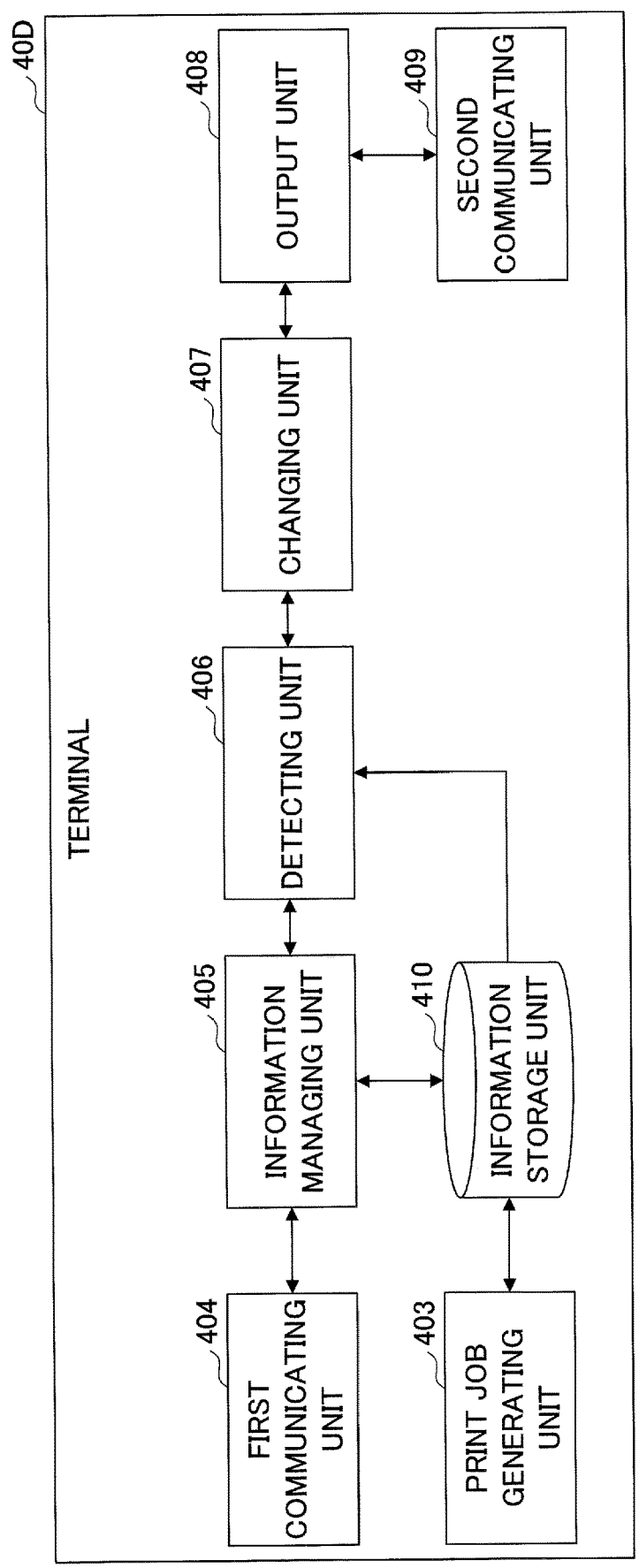
FIG. 23 is a block diagram illustrating an example of a functional configuration of a terminal according to a third embodiment of the present invention.

FIG. 23 is a block diagram illustrating an example of the functional configuration of the terminal 40D according to the third embodiment. As illustrated in FIG. 23, the terminal 40D includes, as functional elements, the print job generating unit 403, a first communicating unit 404, an information managing unit 405, a detecting unit 406, a changing unit 407, an output unit 408, a second communicating unit 409, and an information storage unit 410. The print job generating unit 403 has the same configuration as the print job generating unit 403 of the terminal 40 according to the first embodiment.

The functions of the first communicating unit 404 and the second communicating unit 409 are implemented by the I/F device 47, the CPU 41, and the like. The first communicating unit 404 and the second communicating unit 409 control communication with other apparatuses via the second communication network 70. The first communicating unit 404 communicates with the management server 10B via the second communication network 70, and the second communicating unit 409 communicates with the image forming apparatus 50 via the second communication network 70.

The functions of the information managing unit 405, the detecting unit 406, the changing unit 407, and the output unit 408 are implemented by the CPU 41 and the like.

The information managing unit 405 is the same as the information managing unit 303 of the intermediate server 30 according to the second embodiment. The information managing unit 405 transmits the terminal identification information regarding the terminal 40D together with the print job, via the first communicating unit 404, to the management server 10B, and causes the management server 10B to perform authentication of the terminal identification information.

The detecting unit 406, the changing unit 407, and the output unit 408 respectively have the same configurations as the detecting unit 304, the changing unit 305, and the output unit 306 of the intermediate server 30 according to the second embodiment.

The function of the information storage unit 410 is implemented by the memory 44 and the like. The information storage unit 410 is the same as the information storage unit 308 of the intermediate server 30 according to the second embodiment.

Operation According to Third Embodiment

Figure 24:
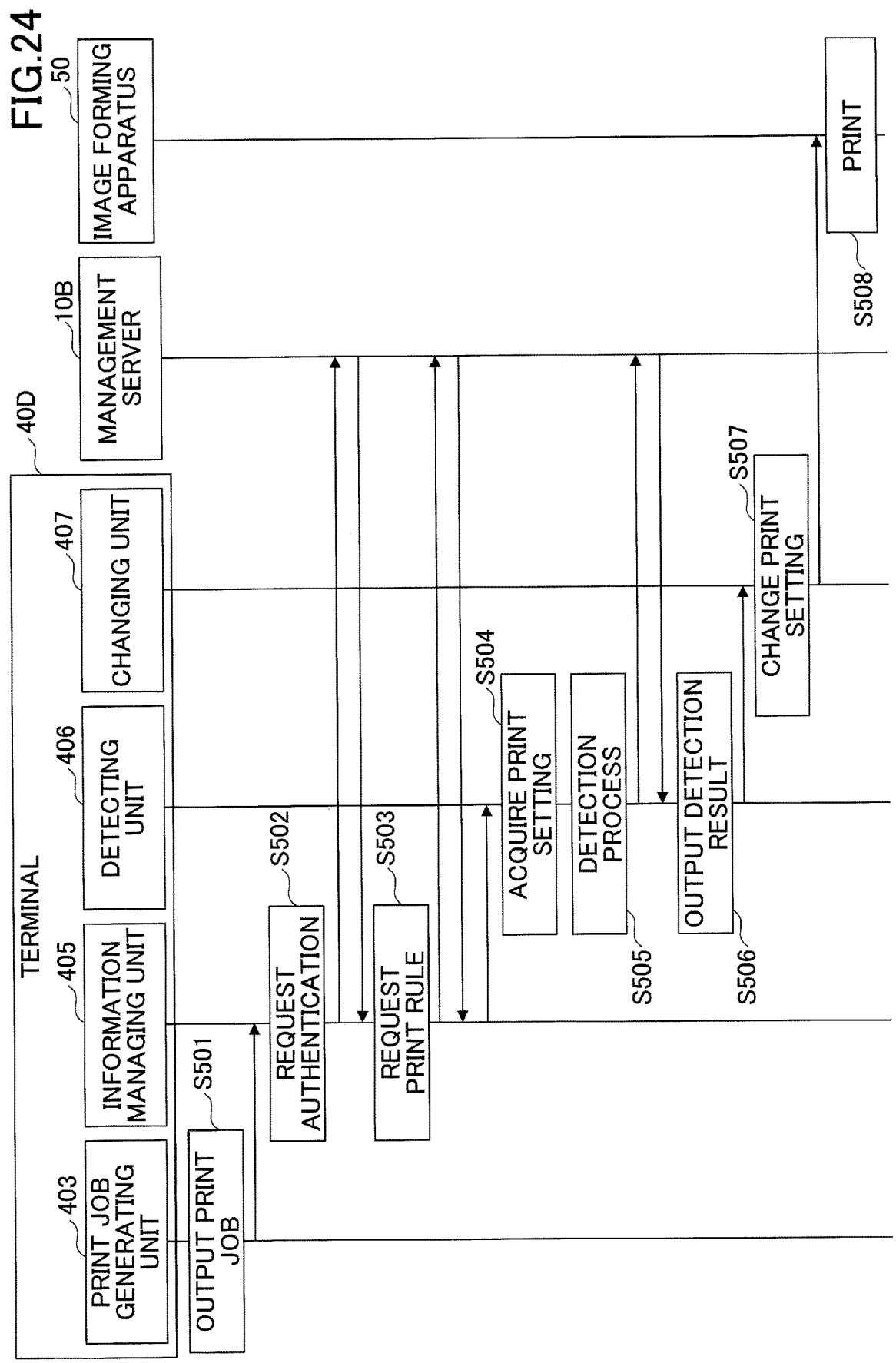
FIG. 24 is a sequence diagram illustrating an example of an operation of an information processing system according to the third embodiment of the present invention.

The operation of the information processing system according to the third embodiment will be described. FIG. 24 is a sequence diagram illustrating an example of the operation of the information processing system according to the third embodiment. As illustrated in FIG. 24, in step S501, the print job generating unit 403 of the terminal 40D generates a print job and outputs the print job to the information managing unit 405.

Next, in step S502, the information managing unit 405 requests the management server 10B to authenticate the terminal identification information regarding the terminal 40D included in the print job. The management server 10B transmits an authentication result indicating whether the terminal identification information is registered in the registered information storage unit 104, to the terminal 40D.

Next, in step S503, when the information managing unit 405 of the terminal 40D receives information indicating authentication unsuccessful, the information managing unit 405 may cause the display device 45 to display a screen indicating authentication unsuccessful or that printing is not possible. When the information managing unit 405 receives information indicating authentication successful, the information managing unit 405 requests the management server 10B for the print rules accumulated in the accumulating unit 103. The management server 10B transmits all of the print rules in the accumulating unit 103 to the terminal 40D. The information managing unit 405 may store the print rules received from the management server 10B in the information storage unit 410.

The processes of steps S504 to S507 are the same as the processes of steps S304 to S307 in the second embodiment. In step S507, the changing unit 407 changes the print setting included in the print job based on the print rule according to the detection result obtained by the detecting unit 406. The output unit 408 transmits the print job in which the print setting has been changed, to the image forming apparatus 50.

Next, in step S508, the image forming apparatus 50 prints the print data included in the received print job on the recording medium according to the print setting.

Modified Example of Third Embodiment

In the third embodiment, direct printing is performed on the print job output from the terminal, while in a modified example of the third embodiment, secure printing is performed. Hereinafter, a description of the present modified example will be given focusing on points that are different from that of the third embodiment, and descriptions of the same points will be omitted accordingly.

The configuration of the information processing system according to the present modified example will be described. The information processing system according to the present modified example includes the management server 10B, the management terminal 20, a terminal 40E, and the image forming apparatus 50A. The management server 10B, the management terminal 20, the terminal 40E, and the image forming apparatus 50A communicate with each other via the second communication network 70. The configuration of the image forming apparatus 50A is the same as that of the second embodiment.

Figure 25:
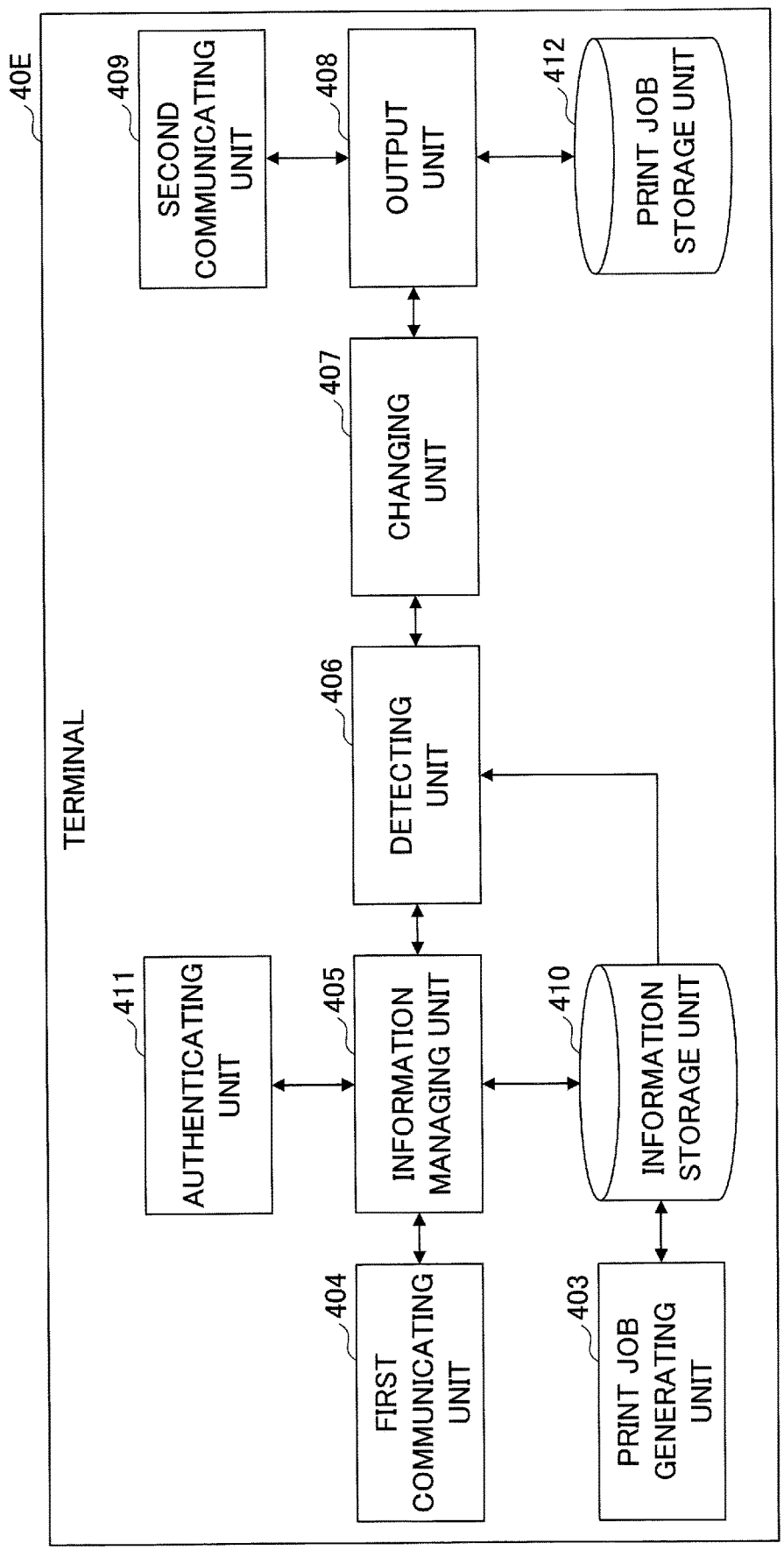
FIG. 25 is a block diagram illustrating an example of a functional configuration of a terminal according to a modified example of the third embodiment.

FIG. 25 is a block diagram illustrating an example of the functional configuration of the terminal 40E according to the modified example of the third embodiment. As illustrated in FIG. 25, the terminal 40E further includes an authenticating unit 411 and a print job storage unit 412 as compared to the terminal 40D of the third embodiment. The authenticating unit 411 and the print job storage unit 412 are respectively the same as the authenticating unit 309 and the print job storage unit 310 according to the second modified example of the second embodiment.

Operation According to Modified Example of Third Embodiment

An example of the operation of the information processing system according to the present modified example will be described. FIGS. 26A and 26B are sequence diagrams illustrating an example of the operation of the information processing system according to the modified example of the third embodiment. FIG. 26A illustrates the operation before the user authentication at the image forming apparatus 50A, and FIG. 26B illustrates the operation after the user authentication at the image forming apparatus 50A.

As illustrated in FIG. 26A, in step S501, when the print job generating unit 403 of the terminal 40 outputs the print job to the information managing unit 405, the information managing unit 405, the detecting unit 406, and the changing unit 407 perform the processes of steps S502 to S507 in the same manner as in the third embodiment. In step S507, the changing unit 407 changes the print setting included in the print job based on the print rule according to the detection result obtained by the detecting unit 406.

Next, in step S509, the output unit 408 saves and stores the print job including the print setting changed by the changing unit 407 and the print data to which the print setting is to be set, in the print job storage unit 412.

As illustrated in FIG. 26B, after the user outputs the print job via the terminal 40E, the user authentication in secure printing is performed at the image forming apparatus 50A.

First, in step S601, the user inputs identification information of the user to the image forming apparatus 50A.

Next, in step S602, the authenticating unit 504 of the image forming apparatus 50A transmits the input identification information of the user to the management server 10B and requests the authentication of the identification information.

Next, in step S603, the management server 10B executes authentication of the identification information of the user acquired from the image forming apparatus 50A by using the identification information of each user stored in the registered information storage unit 104. The management server 10B transmits the authentication result to the image forming apparatus 50A.

The processes of steps S604 to S606 are the same as the processes of steps S405 to S407 according to the second modified example of the second embodiment. In step S606, the authenticating unit 504 transmits an instruction requesting a print job and the like to the terminal 40E.

Next, in step S607, the output unit 408 of the terminal 40E extracts the requested print job from the print job storage unit 412 and transmits the requested print job to the image forming apparatus 50A.

Next, in step S608, the data control unit 502 of the image forming apparatus 50A converts the data included in the received print job into data suitable for printing and executes printing by outputting the data to the engine control unit 503.

Note that in step S604, in a case where the terminal 40E cannot acquire an instruction requesting printing from the image forming apparatus 50A even when a predetermined time elapses after the print job is output in step S501, the print job stored in the print job storage unit 412 may be discarded.

Other Embodiment

Although examples of embodiments of the present invention have been described, the present invention is not limited to the above-described embodiments or modified examples. That is, various modifications and improvements may be made within the scope of the present invention. For example, variations of embodiments or modified examples and a mode constructed by combining elements of different embodiments and modified examples are also within the scope of the present invention.

For example, in an information processing system according to an embodiment and a modified example, one management server includes the accumulating unit 103 and the registered information storage unit 104; however, the embodiments are not limited as such. A management server including the accumulating unit 103 and a management server including the registered information storage unit 104 may be provided separately.

Further, the information processing system according to the first embodiment and the modified example thereof do not include an intermediate server, but may include an intermediate server. For example, the intermediate server may relay communication between the management server, and the terminal and the image forming apparatus. The intermediate server may also include some of the functions of the management server.

Further, the information processing system according to the third embodiment and the modified example thereof do not include an intermediate server, but may include an intermediate server. For example, the intermediate server may relay communication between the management server, and the terminal and the image forming apparatus. The intermediate server may also include some of the functions of the terminal.

The present invention may also be a program or a non-temporary computer-readable recording medium on which the program is recorded. It will be appreciated that the program can be distributed via a transmission medium such as the Internet.

The ordinal numbers, quantities, and the like used above are all exemplary for the purpose of specifically illustrating the technology of the present invention, and the present invention is not limited to the exemplary numbers. The connection relationship between the elements is exemplified for the purpose of specifically illustrating the technology of the present invention, and the connection relationship for implementing the functions of the present invention is not limited thereto.

Also, in the functional block diagrams, the division of the blocks is an example; the blocks may be implemented as one block, one block may be divided into two or more blocks, and/or some functions may be transferred to other blocks. The functions of multiple blocks with similar functions may be processed in parallel or by time division by a single piece of hardware or software.

According to one embodiment of the present invention, the operation of changing a print rule can be simplified.

The information processing apparatus, the information processing system, and the recording medium are not limited to the specific embodiments described in the detailed description, and variations and modified examples may be made without departing from the spirit and scope of the present invention.

What is claimed is:
1. An information processing apparatus coupled to a terminal device and an image forming apparatus via a network, the information processing apparatus comprising:
    a processor, in communication with a memory, executing a process including:
      receiving a print job from the terminal device;
      accumulating a print rule defining a change of a print setting, said print rule including a plurality of different print setting items;

detecting whether the print setting defined in the print rule as a condition to change the print setting matches a print setting included in the print job;
changing the print setting in the print job according to the print rule, based on a result of the detecting; and
outputting, to the image forming apparatus, the print job in which the print setting has been changed,
wherein the process further includes:
changing a value of the print setting item in the print job to a new value, and applying the new value to corresponding print setting items of all jobs received from the terminal device upon detecting that the value of the print setting item included in the print job does not match a value of a corresponding print setting item in the print rule.

2. The information processing apparatus according to claim 1, wherein
the print rule defines a first print setting and a second print setting in association with each other,
the detecting includes detecting whether the print setting included in the print job matches the first print setting, and
the changing includes changing the print setting included in the print job to the second print setting upon detecting that the print setting included in the print job matches the first print setting.

3. The information processing apparatus according to claim 1, wherein the process further includes:
communicating with the terminal device by a first communicator, to receive identification information together with the print job from the terminal device;
communicating with the image forming apparatus by a second communicator;
storing the print job received from the terminal device in a print job storage;
registering identification information in a registered information storage; and
authenticating the identification information by confirming whether the identification information received from the terminal device is registered in the registered information storage, wherein
the outputting includes outputting, to the image forming apparatus, the print job stored in the print job storage, upon detecting that the identification information is authenticated and that a print request is received from the image forming apparatus via the second communicator.

4. An information processing system comprising a terminal device, an image forming apparatus, and an information processing apparatus that are coupled to each other via a network, wherein the information processing apparatus includes:
a processor, in communication with a memory, executing a process including:
receiving a print job from the terminal device;
accumulating a print rule defining a change of a print setting, said print rule including a plurality of different print setting items;
detecting whether the print setting defined in the print rule as a condition to change the print setting matches a print setting included in the print job;
changing the print setting in the print job according to the print rule, based on a result of the detecting; and
outputting, to the image forming apparatus, the print job in which the print setting has been changed,
wherein the processor is further configured to:
change a value of the print setting item in the print job to a new value, and apply the new value to corresponding print setting items of all jobs received from the terminal device upon detecting that the value of the print setting item included in the print job does not match a value of a corresponding print setting item in the print rule.

5. The information processing system according to claim 4, wherein
the print rule defines a first print setting and a second print setting in association with each other,
the detecting includes detecting whether the print setting included in the print job matches the first print setting, and
the changing includes changing the print setting included in the print job to the second print setting upon detecting that the print setting included in the print job matches the first print setting.

6. The information processing system according to claim 4, wherein the process further includes:
communicating with the terminal device by a first communicator, to receive identification information together with the print job from the terminal device;
communicating with the image forming apparatus by a second communicator;
storing the print job received from the terminal device in a print job storage;
registering identification information in a registered information storage; and
authenticating the identification information by confirming whether the identification information received from the terminal device is registered in the registered information storage, wherein
the outputting includes outputting, to the image forming apparatus, the print job stored in the print job storage, upon detecting that the identification information is authenticated and that a print request is received from the image forming apparatus via the second communicator.

7. A non-transitory computer-readable recording medium storing a program that causes a computer to execute a process, the computer being coupled to a terminal device and an image forming apparatus via a network, the process comprising:
receiving a print job from the terminal device;
accumulating a print rule defining a change of a print setting, said print rule including a plurality of different print setting items;
detecting whether the print setting defined in the print rule as a condition to change the print setting matches a print setting included in the print job;
changing the print setting in the print job according to the print rule, based on a result of the detecting; and
outputting, to the image forming apparatus, the print job in which the print setting has been changed,
wherein the process further includes:
changing a value of the print setting item in the print job to a new value, and applying the new value of the print setting item in the print job to corresponding print setting items of all jobs received from the terminal device upon detecting that the value of the print setting item included in the print job does not match a value of a corresponding print setting item in the print rule.

* * * * *